US012739564B1

(12) United States Patent
Liu et al.

(10) Patent No.: US 12,739,564 B1
(45) Date of Patent: Sep. 15, 2026

(54) ADAPTIVE BEAM CANCELLATION

(71) Applicant: Amazon Technologies, Inc., Seattle, WA (US)

(72) Inventors: Ian Ernan Liu, San Diego, CA (US); Robert Ayrapetian, Morgan Hil, CA (US); Pradeep Kumar Govindaraju, San Jose, CA (US); Madhuri Saraf, Sunnyvale, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 18/466,272

(22) Filed: Sep. 13, 2023

(51) Int. Cl.
*H04R 5/04* (2006.01)
*H04R 1/40* (2006.01)

(52) U.S. Cl.
CPC ............... *H04R 5/04* (2013.01); *H04R 1/406* (2013.01)

(58) Field of Classification Search
CPC ...... H04R 3/04; H04R 2499/13; H04R 1/406; H04R 25/505; H04R 2227/009; H04R 2410/01; H04R 2430/21; H04R 5/04; H04R 1/08; H04R 1/083; H04R 2201/405; H04R 2410/07; H04R 5/02; H04R 1/1041; H04R 2225/0216; H04R 2225/025; H04R 2225/55; H04R 2227/007; H04R 2460/01; H04R 25/604; H04R 25/654; H04R 25/656; H04R 29/006; H04R 1/005; H04R 1/02; H04R 1/021; H04R 2460/07; H04R 2499/15; H04R 25/606; H04R 29/00; H04R 5/027; H04B 3/23; H04B 3/234; H04B 3/237; H04B 3/20; H04B 3/235; H04B 3/21; H04B 3/231; H04B 3/238; H04B 7/015; H04B 3/232; G10K 11/17881;
(Continued)

(56) References Cited

U.S. PATENT DOCUMENTS 5,808,967 A 9/1998 Yu et al.
6,049,607 A 4/2000 Marash et al.
(Continued)

OTHER PUBLICATIONS

U.S. Appl. No. 17/488,471, filed Sep. 29, 2021.
(Continued)

*Primary Examiner* — Lun-See Lao
(74) *Attorney, Agent, or Firm* — Pierce Atwood LLP

(57) ABSTRACT

A system that improves beam cancellation by refining reference beam selection and dynamically controlling an adaptation speed of adaptive filters. For example, a device may control the adaptation speed by dynamically determining a variable step-size parameter based on a relative strength of a microphone signal and/or a signal-to-noise ratio (SNR) value associated with an individual beam. The device may compare current energy levels of the microphone signal to a range of energy levels to determine a microphone step-size value, track a minimum noise floor to determine an SNR step-size value, and determine the variable step-size parameter using a sigmoid curve. Additionally or alternatively, the device can use a hybrid approach to select reference beams and can perform neighbor exclusion to further protect speech. For example, the device may exclude reference beams that are adjacent to a target beam to prevent the speech from being represented in the reference beams.

20 Claims, 16 Drawing Sheets

(58) Field of Classification Search

CPC ....... G10K 11/17854; G10K 2210/505; G10K 11/178; G10K 2210/3028; G10K 11/17817; G10K 11/17857; G10K 2210/1282; G10K 11/17823; G10K 11/17825; G10K 2210/3012; G10K 11/17885; G10K 11/002; G10K 2210/108; G10K 2210/3027; G10K 2210/12; G10K 2210/1281; G10K 2210/3221; G10K 11/16; G10K 11/175

USPC ............ 381/26, 56–58, 71.12–71.14; 700/94

See application file for complete search history.

(56) References Cited

U.S. PATENT DOCUMENTS

| | | | | |
|---|---|---|---|---|
| 6,836,243 | B2 | 12/2004 | Kajala et al. | |
| 7,117,145 | B1 | 10/2006 | Venkatesh et al. | |
| 7,174,022 | B1 | 2/2007 | Zhang et al. | |
| 7,190,775 | B2 | 3/2007 | Rambo | |
| 7,359,520 | B2 | 4/2008 | Brennan et al. | |
| 8,139,787 | B2 | 3/2012 | Haykin et al. | |
| 8,160,273 | B2 | 4/2012 | Visser et al. | |
| 8,175,291 | B2 | 5/2012 | Chan et al. | |
| 8,296,143 | B2 | 10/2012 | Kudoh | |
| 8,321,214 | B2 | 11/2012 | Chan et al. | |
| 8,538,749 | B2 | 9/2013 | Visser et al. | |
| 8,620,672 | B2 | 12/2013 | Visser et al. | |
| 8,744,849 | B2 | 6/2014 | Liao | |
| 8,831,936 | B2 | 9/2014 | Toman et al. | |
| 8,849,657 | B2 | 9/2014 | Shin | |
| 8,861,756 | B2 | 10/2014 | Zhu et al. | |
| 8,929,564 | B2 | 1/2015 | Kikkeri | |
| 8,954,324 | B2 | 2/2015 | Wang et al. | |
| 9,048,942 | B2 | 6/2015 | Hershey et al. | |
| 9,173,025 | B2 | 10/2015 | Dickins et al. | |
| 9,224,393 | B2 | 12/2015 | Kjems et al. | |
| 9,275,642 | B2 | 3/2016 | Abdossalami et al. | |
| 9,338,551 | B2 | 5/2016 | Thyssen et al. | |
| 9,432,769 | B1 | 8/2016 | Sundaram et al. | |
| 9,456,276 | B1 | 9/2016 | Chhetri | |
| 9,530,406 | B2 | 12/2016 | Oh | |
| 9,653,060 | B1 | 5/2017 | Hilmes et al. | |
| 9,659,555 | B1 | 5/2017 | Hilmes et al. | |
| 9,689,960 | B1 | 6/2017 | Barton et al. | |
| 9,711,131 | B2 | 7/2017 | Christoph | |
| 9,747,920 | B2 | 8/2017 | Ayrapetian et al. | |
| 9,818,425 | B1 | 11/2017 | Ayrapetian et al. | |
| 9,966,059 | B1 | 5/2018 | Ayrapetian et al. | |
| 9,966,086 | B1 | 5/2018 | Piersol et al. | |
| 9,967,661 | B1 | 5/2018 | Hilmes et al. | |
| 9,973,849 | B1 | 5/2018 | Zhang et al. | |
| 10,187,721 | B1 | 1/2019 | Mansour | |
| 10,306,361 | B2 | 5/2019 | Morton et al. | |
| 10,339,954 | B2 | 7/2019 | Kamdar et al. | |
| 10,366,702 | B2 | 7/2019 | Morton et al. | |
| 10,403,299 | B2 | 9/2019 | Wung et al. | |
| 10,475,471 | B2 | 11/2019 | Ebenezer | |
| 10,499,139 | B2 | 12/2019 | Ganeshkumar | |
| 10,522,167 | B1 | 12/2019 | Ayrapetian et al. | |
| 10,598,543 | B1 | 3/2020 | Mansour et al. | |
| 10,657,981 | B1 | 5/2020 | Mansour et al. | |
| 10,771,894 | B2 | 9/2020 | Janse et al. | |
| 10,887,709 | B1 | 1/2021 | Mansour et al. | |
| 11,094,334 | B2 | 8/2021 | Wang et al. | |
| 11,200,908 | B2 | 12/2021 | Liu et al. | |
| 11,539,833 | B1 * | 12/2022 | Nakagawa | H04R 3/02 |
| 11,657,829 | B2 | 5/2023 | Popovic et al. | |
| 12,531,048 | B1 * | 1/2026 | Pulugurtha | G10K 11/17881 |
| 2004/0175006 | A1 | 9/2004 | Kim et al. | |
| 2008/0208538 | A1 | 8/2008 | Visser et al. | |
| 2008/0312918 | A1 | 12/2008 | Kim | |
| 2009/0034752 | A1 | 2/2009 | Zhang et al. | |
| 2013/0301840 | A1 * | 11/2013 | Yemdji | H04M 9/082 381/66 |
| 2013/0304476 | A1 | 11/2013 | Kim et al. | |
| 2014/0025374 | A1 | 1/2014 | Lou | |
| 2016/0205263 | A1 | 7/2016 | Liu et al. | |
| 2019/0394576 | A1 * | 12/2019 | Petersen | H04R 25/356 |
| 2020/0372891 | A1 * | 11/2020 | Bou Daher | G10L 21/0232 |
| 2021/0249005 | A1 * | 8/2021 | Bromand | G10L 21/0208 |
| 2021/0312936 | A1 | 10/2021 | Hu | |
| 2022/0406286 | A1 | 12/2022 | Yamanashi et al. | |
| 2023/0055257 | A1 | 2/2023 | Li | |

OTHER PUBLICATIONS

U.S. Appl. No. 17/470,035, filed Sep. 9, 2021.
U.S. Appl. No. 18/323,697, filed May 25, 2023.
U.S. Appl. No. 18/460,955, filed Sep. 5, 2023.

* cited by examiner

FIG. 8

Microphone Variable Step-Size 810

$$V_{ssmics} = \frac{P_{mic} - P_{low}}{P_{high} - P_{low}}$$

$$0 \leq V_{ssmics} \leq 1$$

$$V_{ssmics} = 0, if P_{mic} \leq P_{low}$$

$$V_{ssmics} = 1, if P_{mic} \geq P_{high}$$

SNR Variable Step-Size 820

$$V_{ss-SNR} = \frac{A}{1+B*SNR}$$

$$V_{ss-SNR} = \min\left(1, V_{ss-SNR}\right)$$

Final Variable Step-Size 830

$$V_{ss} = \text{sigmoid}(V_{ss-Mics} * V_{ss-SNR})$$

Coefficient Update 840

$$W(k, n+1) = W(k, n) + \mu \frac{V_{ss}(k,n)\, E(k,n)\, X^{*}(k,n)}{\alpha \|X(k,n)\|^{2} + \delta}$$

FIG. 9
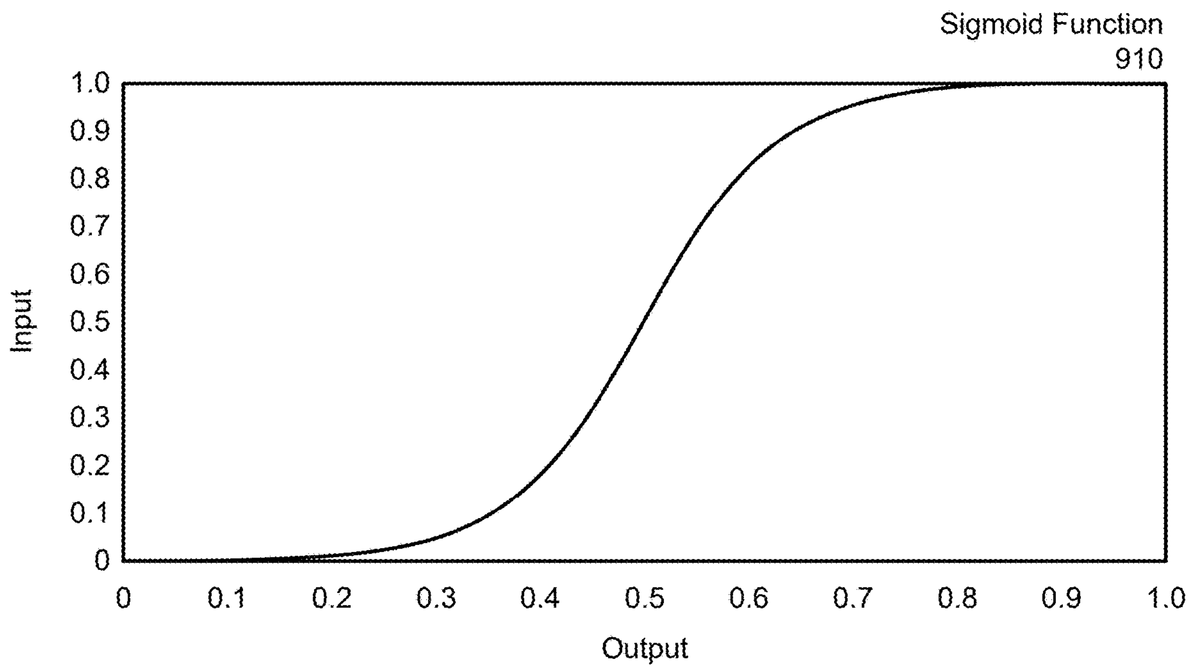
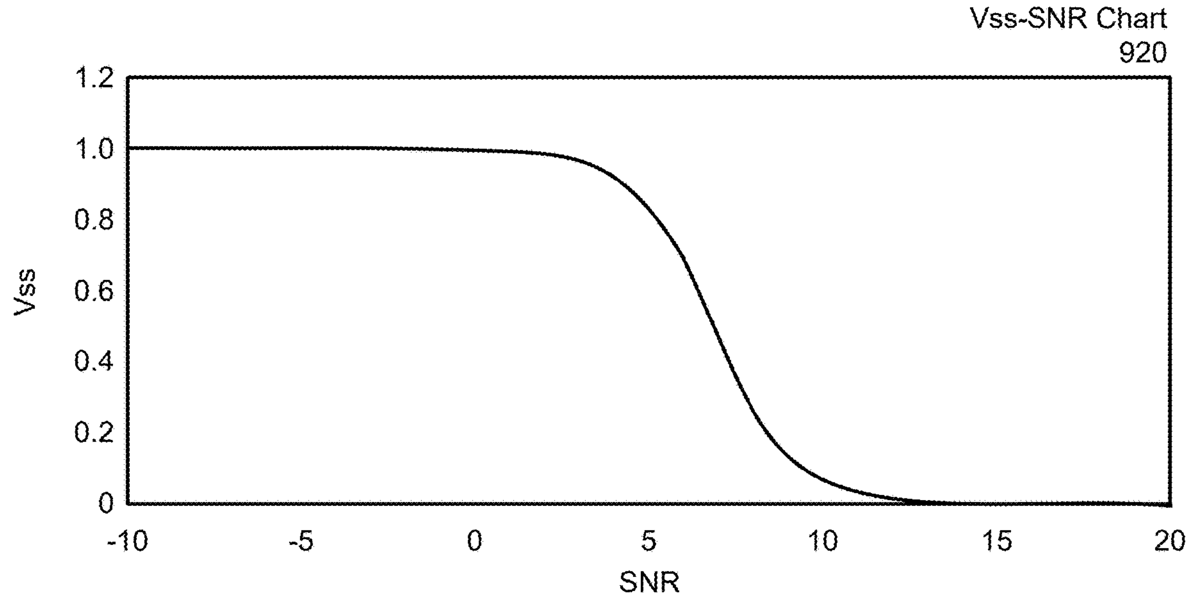

ADAPTIVE BEAM CANCELLATION

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

BRIEF DESCRIPTION OF DRAWINGS

For a more complete understanding of the present disclosure, reference is now made to the following description taken in conjunction with the accompanying drawings.

FIG. 8 illustrates examples of determining step-size parameters according to embodiments of the present disclosure.

FIG. 9 illustrates examples of a sigmoid function and a variable step-size controlled based on a signal quality metric according to embodiments of the present disclosure.

DETAILED DESCRIPTION

Figure 1:
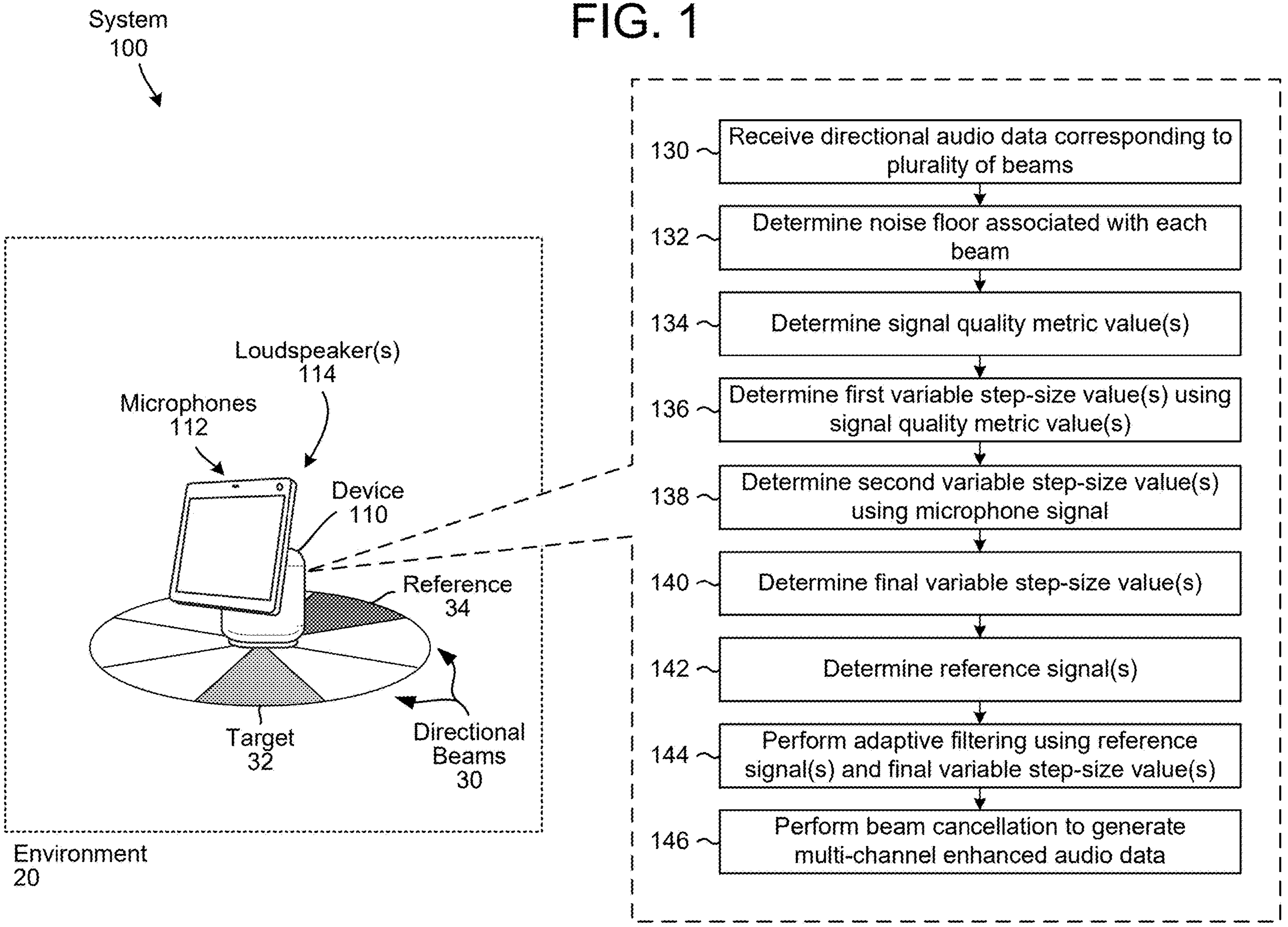
FIG. 1 illustrates a system for performing beam cancellation according to embodiments of the present disclosure.

Electronic devices may be used to capture and process audio data. The audio data may be used for voice commands and/or may be output by loudspeakers as part of a communication session. In some examples, loudspeakers may generate output audio using playback audio data while a microphone generates microphone audio data. An electronic device may perform audio processing, such as acoustic echo cancellation (AEC), beamforming, adaptive interference cancellation (AIC), and/or the like, to remove undesired noise and isolate user speech to be used for voice commands and/or the communication session. For example, the audio processing may remove undesired noise such as background speech, ambient sounds in the environment, an "echo" signal corresponding to the playback audio data, and/or the like from the microphone audio data.

Certain devices capable of capturing speech for speech processing may operate a using a microphone array comprising multiple microphones, where beamforming techniques may be used to isolate desired audio including speech. One technique for beamforming involves a fixed beamformer unit that employs a filter-and-sum structure to boost an audio signal that originates from a desired direction (sometimes referred to as the look-direction) while largely attenuating audio signals that originate from other directions. While a fixed beamformer unit may effectively eliminate certain diffuse noise (e.g., undesired audio), which is detectable in similar energies from various directions, it may be less effective in eliminating noise emanating from a single source in a particular non-desired direction. In some examples, the beamformer unit may also incorporate an adaptive beamformer unit/noise canceller that can adaptively cancel noise from different directions depending on audio conditions.

As the direction of a signal of interest (usually speech) is not known a-priori and may change over time, the device may perform beamforming by simultaneously processing multiple beams, often uniformly distributed around 360 degrees. For example, the device may perform beamforming to generate a plurality of directional audio signals, with an individual directional audio signal isolating audio from a particular direction. As specific components used for speech processing may only be configured to operate on a single stream of audio data, however, the device may perform beam selection to select one or more directional audio signal(s) corresponding to the signal of interest, may perform beam merging to generate single-channel output audio data using the selected directional audio signal(s), and may send the output audio data to downstream components for wakeword detection and/or speech processing.

To improve beam cancellation, devices, systems and methods are disclosed that refine reference beam selection and dynamically control an adaptation speed of adaptive filters during beam cancellation. For example, the device may control the adaptation speed to adapt quickly when near-end signals (e.g., loud noises in proximity to the device) are not present (e.g., to enable faster convergence) and adapt slowly when near-end signals are present (e.g., to minimize damage to the near-end speech). The device controls adaptation speed by dynamically determining a variable step-size parameter based on a relative strength of a microphone signal and/or a signal-to-noise ratio (SNR) value associated with an individual beam. For example, the device can compare current energy levels of the microphone signal to a range of energy levels to determine a microphone step-size value, can use minimum noise statistics to determine the SNR step-size value, and can calculate the variable step-size parameter using a sigmoid curve. Additionally or alternatively, the device can use a hybrid approach to select reference beams and can perform neighbor exclusion to further protect speech. For example, the device may exclude reference beams that are adjacent to a target beam to increase spatial separation and prevent the speech from being represented in the reference beams.

FIG. 1 illustrates a system for performing beam cancellation using a device according to embodiments of the present disclosure. For example, the system may be configured to receive or generate beamformed audio signals and process the beamformed audio signals to generate an output audio signal. Although FIG. 1, and other figures/discussion illustrate the operation of the system in a particular order, the steps described may be performed in a different order (as well as certain steps removed or added) without departing from the intent of the disclosure.

As illustrated in FIG. 1, a system 100 may include a device 110 that may include microphones 112 in a microphone array and/or one or more loudspeaker(s) 114. However, the disclosure is not limited thereto and the device 110 may include additional components without departing from the disclosure. While FIG. 1 illustrates the loudspeaker(s) 114 being internal to the device 110, the disclosure is not limited thereto and the loudspeaker(s) 114 may be external to the device 110 without departing from the disclosure. For example, the loudspeaker(s) 114 may be separate from the device 110 and connected to the device 110 via a wired connection and/or a wireless connection without departing from the disclosure.

To detect user speech or other audio, the device 110 may use the microphones 112 to generate microphone audio data that captures audio in a room (e.g., an environment 20) in which the device 110 is located. As is known and as used herein, "capturing" an audio signal includes a microphone transducing audio waves (e.g., sound waves) of captured sound to an electrical signal and a codec digitizing the signal to generate the microphone audio data. In some examples, the microphones 112 may be included in a microphone array, such as an array of eight microphones. However, the disclosure is not limited thereto and the device 110 may include any number of microphones 112 without departing from the disclosure.

The device 110 may be an electronic device configured to send audio data to and/or receive audio data. For example, the device 110 (e.g., local device) may receive playback audio data $x_r(t)$ (e.g., far-end reference audio data) from a remote device and the playback audio data $x_r(t)$ may include remote speech, music, and/or other output audio. In some examples, the user may be listening to music or a program and the playback audio data $x_r(t)$ may include the music or other output audio (e.g., talk-radio, audio corresponding to a broadcast, text-to-speech output, etc.). However, the disclosure is not limited thereto and in other examples the user may be involved in a communication session (e.g., conversation between the user and a remote user local to the remote device) and the playback audio data $x_r(t)$ may include remote speech originating at the remote device. In both examples, the device 110 may generate output audio corresponding to the playback audio data $x_r(t)$ using the one or more loudspeaker(s) 114. While generating the output audio, the device 110 may capture microphone audio data $x_m(t)$ (e.g., input audio data) using the microphones 112. In addition to capturing desired speech (e.g., the microphone audio data includes a representation of local speech from a user), the device 110 may capture a portion of the output audio generated by the loudspeaker(s) 114 (including a portion of the music and/or remote speech), which may be referred to as an "echo" or echo signal, along with additional acoustic noise (e.g., undesired speech, ambient acoustic noise in an environment around the device 110, etc.), as discussed in greater detail below.

In some examples, the microphone audio data $x_m(t)$ may include a voice command, which may be indicated by a keyword (e.g., wakeword). For example, the device 110 detect that the wakeword is represented in the microphone audio data $x_m(t)$ and may cause language processing to be performed on the microphone audio data $x_m(t)$. Thus, a language processing component associated with the device 110 and/or a remote device may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the language processing component may perform Automatic Speech Recognition (ASR) processing, Natural Language Understanding (NLU) processing and/or command processing. The voice commands may control the device 110, audio devices (e.g., play music over loudspeaker(s) 114, capture audio using microphones 112, or the like), multimedia devices (e.g., play videos using a display, such as a television, computer, tablet or the like), smart home devices (e.g., change temperature controls, turn on/off lights, lock/unlock doors, etc.) or the like.

Additionally or alternatively, in some examples the device 110 may send the microphone audio data $x_m(t)$ to the remote device as part of a Voice over Internet Protocol (VOIP) communication session or the like. For example, the device 110 may send the microphone audio data $x_m(t)$ to the remote device and may receive the playback audio data $x_r(t)$ from the remote device. During the communication session, the device 110 may also detect the keyword (e.g., wakeword) represented in the microphone audio data $x_m(t)$ and send a portion of the microphone audio data $x_m(t)$ to the language processing component in order for the language processing component to determine a voice command.

Prior to sending the microphone audio data $x_m(t)$ to the language processing component, the device 110 may perform audio processing to isolate local speech captured by the microphones 112 and/or to suppress unwanted audio data (e.g., echoes and/or noise). For example, the device 110 may perform beamforming (e.g., operate microphones 112 using beamforming techniques) to isolate speech or other input audio corresponding to target direction(s). Additionally or alternatively, the device 110 may perform acoustic echo cancellation (AEC), adaptive interference cancellation (AIC), adaptive beam cancellation, and/or other audio processing without departing from the disclosure.

In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system. To illustrate an example, the device 110 may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on.

Using the beamformed audio data, the device 110 may then process portions of the beamformed audio data separately to isolate the desired speech and/or remove or reduce noise. For example, the device 110 may select a single audio signal associated with a first direction as a target beam, determine one or more reference beams for the target beam, and perform beam cancellation by subtracting the reference beam(s) from the target beam. As illustrated in FIG. 1, the device 110 may generate beamformed audio data corresponding to individual directions, which are represented as directional beams 30. To illustrate an example of performing beam cancellation, the device 110 may select a target beam 32 associated with a first direction from the plurality of directional beams 30, determine a reference beam 34 (or multiple reference beams 34) corresponding to the target beam 32, and then perform beam cancellation to generate an enhanced audio signal associated with the first direction.

In some examples, the device 110 may perform beam cancellation individually for a plurality of target beams 32 to generate enhanced audio data corresponding to a plurality of directions. For example, if the directional beams 30 correspond to N beams, the device 110 may select each of the N beams as a target beam 32 and generate N enhanced audio signals, although the disclosure is not limited thereto. After performing beam cancellation, in some examples the device 110 may select enhanced audio signals corresponding to two or more directions for further processing. For example, the device 110 may combine enhanced audio signals corresponding to multiple directions and send the combined beamformed audio data to the language processing component, although the disclosure is not limited thereto.

As illustrated in FIG. 1, the device 110 may receive (130) directional audio data corresponding to a plurality of beams. For example, the microphones 112 may generate first audio data and a beamformer component (not illustrated) may perform beamforming using the first audio data to generate the directional audio data. While not illustrated in FIG. 1, an audio processing component may be configured to perform audio processing on the directional audio data prior to step 130. For example, the audio processing component may be configured to synchronize a first portion of the first audio data (e.g., first channel) corresponding to a first microphone 112*a* with a second portion of the first audio data (e.g., second channel) corresponding to a second microphone 112*b*. In addition to synchronizing each of the individual microphone channels included in the first audio data, the audio processing component may perform additional audio processing such as echo cancellation, noise suppression, and/or the like, although the disclosure is not limited thereto.

Using the directional audio data, the device 110 may determine (132) a noise floor associated with each directional beam. For example, the device 110 may determine the noise floor using minimum noise statistics, although the disclosure is not limited thereto. In some examples, the device 110 may determine a minimum noise floor value for each directional beam with a fixed time window, as described in greater detail below with regard to FIG. 7.

Using the noise floor values, the device 110 may determine (134) signal quality metric value(s). In some examples, the device 110 may determine a signal quality metric value, such as a signal-to-noise ratio (SNR) value, associated with each directional beam. For example, the device 110 may determine SNR values for individual directions (e.g., directional beams 30) and/or frequency bands without departing from the disclosure. Using the signal quality metric value(s), the device 110 may determine (136) first variable step-size value(s), as described in greater detail below with regard to FIGS. 7-8. For example, the device 110 may determine an individual SNR step-size value for each directional beam as a function of beam power, such that the SNR step-size value is low if the beam power is relatively low.

While the first variable step-size value(s) are determined as a function of beam power and are therefore unique to each directional beam 30, the device 110 may also determine (138) second variable step-size value(s) using the microphone signal. For example, the device 110 may determine a second variable step-size value using the microphone signal in the time-domain, as described in greater detail below with regard to FIGS. 7-8. In some examples, the device 110 may determine a single second variable step-size value using the microphone signal and may apply the second variable step-size value to each directional beam and/or frequency band, although the disclosure is not limited thereto. In addition, the device 110 may determine (140) final variable step-size value(s) using the first variable step-size value(s) and the second variable step-size value(s), as described in greater detail below with regard to FIGS. 7-8. For example, the final variable step-size value(s) may control a rate at which an adaptive filter updates adaptive filter coefficients during beam cancellation.

As illustrated in FIG. 1, the device 110 may determine (142) reference signal(s) associated with the directional beams 30. For example, the device 110 may select each of the directional beams 30 as a target beam and determine one or more reference signal(s) corresponding to the target beam, as will be described in greater detail below with regard to FIGS. 5 and 10-12. In some examples, the device 110 may select the reference signal(s) based on a known (e.g., fixed) configuration of the directional beams 30, such as selecting a direction that is opposite the target beam. Additionally or alternatively, the device 110 may select the reference signal(s) based on a known noise source, such that multiple target beams are associated with the reference signal(s) corresponding to a highest noise power. In some examples, the device 110 may perform neighbor exclusion to exclude (e.g., ignore) reference signal(s) that are adjacent to the target beam. For example, performing neighbor exclusion may increase a spatial separation between the target beam and the reference signal(s), which may protect speech represented in the target beam.

The device 110 may perform (144) adaptive filtering using the reference signal(s) and the final variable step-size value(s) and may perform (146) beam cancellation to generate multi-channel enhanced audio data. For example, the device 110 may perform beam cancellation by subtracting the reference beam(s) from the target beam. In some examples, the device 110 may perform beam cancellation individually for a plurality of target beams 32 to generate enhanced audio data corresponding to a plurality of directions. For example, if the directional beams 30 correspond to N beams, the device 110 may select each of the N beams as a target beam 32 and generate N enhanced audio signals, although the disclosure is not limited thereto.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones 112 in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. For example, some audio data may be referred to as playback audio data, microphone audio data, error audio data, output audio data, and/or the like. Additionally or alternatively, this audio data may be referred to as audio signals such as a playback signal, microphone signal, error signal, output audio data, and/or the like without departing from the disclosure.

Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as acoustic echo cancellation (AEC), noise reduction (NR) processing, adaptive interference cancellation (AIC) processing, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Playback audio data $x_r(t)$ (e.g., far-end reference signal) corresponds to audio data that will be output by the loudspeaker(s) 114 to generate playback audio (e.g., echo signal y(t)). For example, the device 110 may stream music or output speech associated with a communication session (e.g., audio or video telecommunication). In some examples, the playback audio data may be referred to as far-end reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphones 112 prior to the device 110 performing audio processing such as AEC processing or beamforming. The microphone audio data $x_m(t)$ may include local speech s(t) (e.g., an utterance, such as near-end speech generated by the user), an "echo" signal y(t) (e.g., portion of the playback audio $x_r(t)$ captured by the microphones 112), acoustic noise n(t) (e.g., ambient noise in an environment around the device 110), and/or the like. As the microphone audio data is captured by the microphones 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal y(t) corresponds to a portion of the playback audio that reaches the microphones 112 (e.g., portion of audible sound(s) output by the loudspeaker(s) 114 that is recaptured by the microphones 112) and may be referred to as an echo or echo data y(t). If the device 110 includes a single loudspeaker 114, an acoustic echo canceller (AEC) may perform acoustic echo cancellation for one or more microphones 112. However, if the device 110 includes multiple loudspeakers 114, a multi-channel acoustic echo canceller (MC-AEC) may perform acoustic echo cancellation. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

In some examples, the device 110 may perform echo cancellation using the playback audio data. However, the disclosure is not limited thereto, and the device 110 may perform echo cancellation using the microphone audio data, such as adaptive noise cancellation (ANC), adaptive interference cancellation (AIC), and/or the like, without departing from the disclosure. As used herein, isolated audio data corresponds to audio data after the device 110 performs audio processing (e.g., AEC processing, RES processing, AIC processing, ANC processing, and/or the like) to isolate the local speech s (t).

In some examples, such as when performing echo cancellation using ANC/AIC processing, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction).

The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortion-less Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array having multiple microphones 112 that are laterally spaced from each other so that they can be used by audio beamforming components to produce directional audio signals. The microphones 112 may, in some instances, be dispersed around a perimeter of the device 110 in order to apply beampatterns to audio signals based on sound captured by the microphones. For example, the microphones 112 may be positioned at spaced intervals along a perimeter of the device 110, although the present disclosure is not limited thereto. In some examples, the microphone 112 may be spaced on a substantially vertical surface of the device 110 and/or a top surface of the device 110. Each of the microphones 112 is omnidirectional, and beamforming technology may be used to produce directional audio signals based on audio data generated by the microphones 112. In other embodiments, the microphones 112 may have directional audio reception, which may remove the need for subsequent beamforming.

Using the microphones 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones 112 in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array having multiple microphones 112 that are spaced from each other at known distances. Sound originating from a source is received by each of the microphones 112. However, because each microphone is potentially at a different distance from the sound source, a propagating sound wave arrives at each of the microphones 112 at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones 112 are combined in such a way that signals from a particular direction experience constructive interference, while signals from other directions experience destructive interference. The parameters used in beamforming may be varied to dynamically select different directions, even when using a fixed-configuration microphone array.

As described above, the device 110 may generate microphone audio data $x_m(t)$ using microphones 112. For example, a first microphone 112*a* may generate first microphone audio data $x_{m1}(t)$ in a time domain, a second microphone 112*b* may generate second microphone audio data $x_{m2}(t)$ in the time domain, and so on. As used herein, a time domain signal may be comprised of a sequence of individual samples of audio data, such that x(t) denotes an individual sample that is associated with a time t.

While the microphone audio data x(t) is comprised of a plurality of samples, in some examples the device 110 may group a plurality of samples and process them together. For example, the device 110 may group a number of samples together in a frame to generate microphone audio data x(n). As used herein, microphone audio data x(n) corresponds to the time-domain signal and identifies an individual frame (e.g., fixed number of samples s) associated with a frame index n.

Additionally or alternatively, the device 110 may convert microphone audio data x(n) from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) in the frequency domain or the subband domain. As used herein, microphone audio data X(n, k) corresponds to the frequency-domain signal and identifies an individual frame associated with frame index n and tone index k. Thus, while the microphone audio data x(t) corresponds to time indexes, the microphone audio data x(n) and the microphone audio data X(n, k) corresponds to frame indexes.

A Fast Fourier Transform (FFT) is a Fourier-related transform used to determine the sinusoidal frequency and phase content of a signal and performing a FFT operation produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin). To illustrate an example, the system 100 may apply FFT processing to the time-domain microphone audio data x(n), producing the frequency-domain microphone audio data X(n,k), where the tone index "k" (e.g., frequency index) ranges from 0 to K and "n" is a frame index ranging from 0 to N. Thus, the history of the values across iterations is provided by the frame index "n", which ranges from 1 to N and represents a series of samples over time.

In some examples, the device 110 may perform a K-point FFT on a time-domain signal. For example, if the device 110 performs a 256-point FFT on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. Thus, each tone index in the 256-point FFT corresponds to a frequency range (e.g., subband) in the 16 kHz time-domain signal. While the example above refers to the frequency range being divided into 256 different subbands (e.g., tone indexes), the disclosure is not limited thereto and the system 100 may divide the frequency range into K different subbands (e.g., K indicates an FFT size). In addition, while the example described above refers to the tone index being generated using the K-point FFT operation, the disclosure is not limited thereto. Instead, the tone index may be generated using Short-Time Fourier Transform (STFT), generalized Discrete Fourier Transform (DFT) and/or other transforms known to one of skill in the art (e.g., discrete cosine transform, non-uniform filter bank, etc.) without departing from the disclosure.

The system 100 may include multiple microphones 112, with a first channel m corresponding to a first microphone 112*a*, a second channel (m+1) corresponding to a second microphone 112*b*, and so on until a final channel (M) that corresponds to microphone 112M. While some drawings illustrate four channels or eight channels, the disclosure is not limited thereto and the number of channels may vary. For the purposes of discussion, an example of system 100 includes "M" microphones 112 (M>1) for hands free near-end/far-end distant speech recognition applications.

While the examples described above refer to the microphone audio data $x_m$ (t), the disclosure is not limited thereto and the same techniques apply to the playback audio data $x_r$ (t) without departing from the disclosure. Thus, playback audio data $x_r$ (t) indicates a specific time index t from a series of samples in the time-domain, playback audio data $x_r$ (n) indicates a specific frame index n from series of frames in the time-domain, and playback audio data $x_r$(n, k) indicates a specific frame index n and frequency index k from a series of frames in the frequency-domain.

Prior to converting the microphone audio data $x_m$ (n) and the playback audio data $x_r$ (n) to the frequency-domain, in some examples the device 110 may first perform time-alignment to align the playback audio data $x_r$(n) with the microphone audio data $x_m$(n). For example, due to nonlinearities and variable delays associated with sending the playback audio data $x_r$(n) to external loudspeaker(s) using a wireless connection, the playback audio data $x_r$(n) may not synchronized with the microphone audio data $x_m$(n). This lack of synchronization may be due to a propagation delay (e.g., fixed time delay) between the playback audio data $x_r$(n) and the microphone audio data $x_m$(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data $x_r$(n) to match the microphone audio data $x_m$(n). For example, the device 110 may adjust an offset between the playback audio data $x_r$(n) and the microphone audio data $x_m$(n) (e.g., adjust for propagation delay), may add/subtract samples and/or frames from the playback audio data $x_r$(n) (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data, although the disclosure is not limited thereto.

Figure 2:
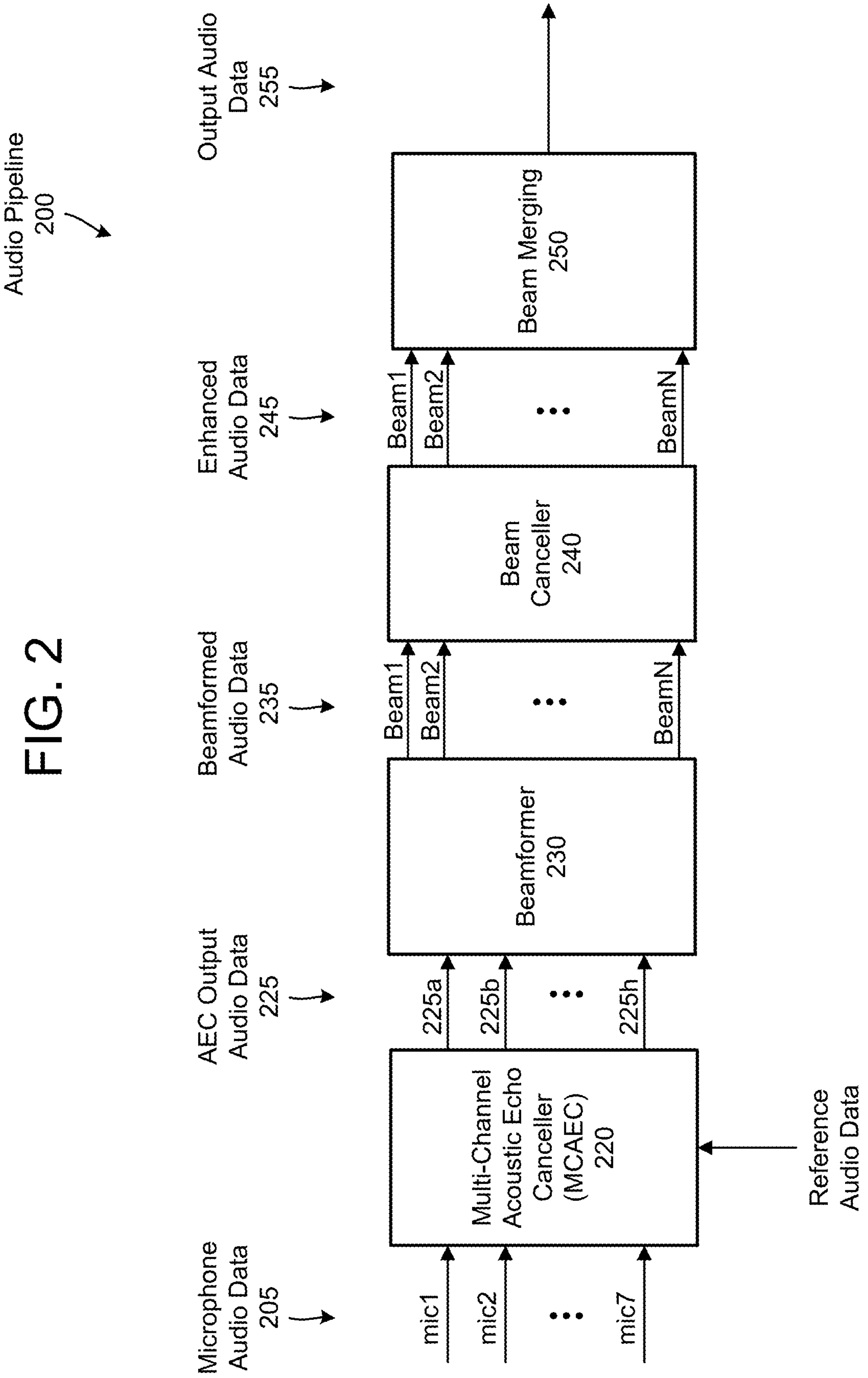
FIG. 2 illustrates a component diagram for an audio pipeline according to embodiments of the present disclosure.

FIG. 2 illustrates a component diagram for an audio pipeline according to embodiments of the present disclosure. As illustrated in FIG. 2, an audio pipeline 200 may include audio processing components configured to perform a variety of audio processing to isolate the desired speech and generate output audio data. For example, the audio processing components may include a multi-channel acoustic echo canceller (MCAEC) 220 component configured to perform echo cancellation to remove an echo signal from the microphone audio data. After performing echo cancellation, the audio processing components may include a beamformer component 230, beam canceller component 240, and a beam merging component 250, although the disclosure is not limited thereto.

As illustrated in FIG. 2, the MCAEC component 220 may receive microphone audio data 205 (e.g., mic1, mic2, . . . micM) from the microphones 112 and may be configured to perform echo cancellation to generate AEC output audio data 225. As the audio pipeline 200 is configured to process microphone audio data 205 generated by multiple microphones, the audio pipeline 200 includes the MCAEC component 220 configured to perform multi-channel echo cancellation. For example, the MCAEC component 220 may receive microphone audio data 205 (e.g., microphone audio data $x_m$(t)) from two or more microphones 112 and may perform echo cancellation individually for each of the microphones 112. Thus, the microphone audio data 205 may include an individual channel for each microphone, such as a first channel mic1 associated with a first microphone 112*a*, a second channel mic2 associated with a second microphone 112*b*, and so on until a final channel micM associated with an M-th microphone 112*m*. While FIG. 2 illustrates an example in which the microphone audio data 205 includes seven microphone channels, the disclosure is not limited thereto and the number of microphone channels may vary without departing from the disclosure.

Similarly, the MCAEC component 220 may receive reference audio data 215 (e.g., playback audio data $x_r$ (t)) associated with one or more loudspeakers 114 of the device 110. In some examples, the reference audio data 215 may correspond to a single loudspeaker 114, such that the reference audio data 215 only includes a single channel. However, the disclosure is not limited thereto, and in other examples the reference audio data 215 may correspond to multiple loudspeakers 114 without departing from the disclosure. For example, the reference audio data 215 may include five separate channels, such as a first channel corresponding to a first loudspeaker 114*a* (e.g., woofer), a second channel corresponding to a second loudspeaker 114*b* (e.g., tweeter), and three additional channels corresponding to three additional loudspeakers 114*c*-114*e* (e.g., midrange) without departing from the disclosure. The disclosure is not limited thereto, however, and the number of loudspeakers may vary without departing from the disclosure.

In some examples, the reference signal may correspond to playback audio data used to generate output audio. For example, the device 110 may receive the playback audio data and may generate output audio by sending the playback audio data to one or more loudspeaker(s) 114 associated with the device 110. Thus, the AEC component 220 may receive the playback audio data (e.g., reference audio data 215) and may use adaptive filters to generate the reference signal, which corresponds to an estimated echo signal represented in the microphone audio data 205. By subtracting the reference signal from the microphone audio data 205, the MCAEC component 220 may remove at least a portion of the echo signal and isolate local speech represented in the microphone audio data 205. For example, the MCAEC component 220 may generate a first channel of AEC output audio data 225*a* corresponding to the first microphone 112*a*, a second channel of AEC output audio data 225*b* corresponding to the second microphone 112*b*, and so on. Thus, the device 110 may process the individual channels separately.

As illustrated in FIG. 2, in some examples the audio pipeline 200 may include a beamformer component 230 that may receive the AEC output audio data 225 and perform beamforming to generate beamformed audio data 235. To illustrate an example, the beamformer component 230 may generate directional audio data corresponding to N unique directions (e.g., N unique beams, such as [Beam1, Beam2, . . . . BeamN]). For example, the beamformed audio data 235 may comprise a plurality of audio signals that includes a first audio signal corresponding to a first direction, a second audio signal corresponding to a second direction, a third audio signal corresponding to a third direction, and so on. The number of unique directions may vary without departing from the disclosure, and may be similar or different from the number of microphones 112.

As described above, the device 110 may include a first number of microphones (e.g., M) and generate a second number of beams (e.g., N). However, the disclosure is not limited thereto and the device 110 may include any number of microphone channels and generate any number of beams without departing from the disclosure. Thus, the first number of microphones (e.g., M) and the second number of beams (e.g., N) may be the same or different without departing from the disclosure. Additionally or alternatively, while FIG. 2 illustrates the beamformer component 230 performing beamforming processing on the AEC output audio data 225, the disclosure is not limited thereto. In some examples, the beamformer component 230 may perform beamforming processing on the microphone audio data 205 without departing from the disclosure.

In the example illustrated in FIG. 2, the beamformer component 230 may correspond to a Fixed Beamformer (FBF) component and may be followed by beam canceller component 240, which may correspond to an adaptive beamformer (ABF) component, although the disclosure is not limited thereto. The beam canceller component 240 may be configured to perform beam to beam cancellation using the beamformed audio data 235 to generate enhanced audio data 245. In order to isolate desired speech, the beam canceller component 240 may dynamically select target signal(s) and/or reference signal(s). Thus, in some examples the target signal(s) and/or the reference signal(s) may be continually changing over time based on speech, acoustic noise(s), ambient noise(s), and/or the like in an environment around the device 110. For example, the beam canceller component 240 may select the target signal(s) by detecting speech, based on signal strength values or signal quality metrics (e.g., signal-to-noise ratio (SNR) values, average power values, etc.), and/or using other techniques or inputs, although the disclosure is not limited thereto.

As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the beam canceller component 240 may vary, resulting in different filter coefficient values over time.

As illustrated in FIG. 2, a beam merging component 250 may receive the enhanced audio data 245 and generate output audio data 255. In some examples, the beam merging component 250 may select portions of the enhanced audio data 245 (e.g., enhanced directional audio data) corresponding to two or more directions and generate the output audio data 255 using a weighted sum that combines these portions of the enhanced audio data 245.

While FIG. 2 illustrates an example of the audio pipeline 200 including the beamformer component 230 and the beam canceller component 240, the disclosure is not limited thereto. In some examples, the beamformer component 230 may correspond to a Fixed Beamformer (FBF) component configured to generate directional audio data in a plurality of directions, while the beam canceller component 240 may correspond to an Adaptive Beamformer (ABF) component configured to perform adaptive beamforming and generate the enhanced audio data 245, although the disclosure is not limited thereto.

While FIG. 2 illustrates the audio pipeline 200 processing each of the microphone channels independently, the disclosure is not limited thereto. In some examples, the audio pipeline 200 may process only a portion of the microphone channels (e.g., the AEC output audio data 225 only corresponds 1-3 channels) and/or combine the multiple microphone channels into a single output (e.g., the AEC output audio data 225 corresponds to a single channel) without departing from the disclosure.

As part of beam merging, the device 110 may merge a set of neighboring beams while maintaining temporal continuity between frames. As will be described in greater detail below with regard to FIG. 4B, the device 110 may define a first number (e.g., C) of beam groups, such that each beam group c contains multiple beams that are spatially close to each other. Using the pre-defined set of beam groups that contain spatially close beams, the device 110 may eliminate or reduce a number of disjointed transitions that may cause distortion in the output signal. In addition, the device 110 may use a weight/gain parameter to introduce a bias for preferable directions (e.g., directions likely to correspond to the user) based on a relative position of the device 110. These weight/gain parameters may also provide an additional preference for certain beam groups over other beam groups based on a typical implementation of the device 110, although the disclosure is not limited thereto.

As will be described in greater detail below, the device 110 may perform beam merging by identifying a beam group with the highest overall SNR plus gain value (e.g., gain parameter is multiplied with the corresponding beam group during SNR estimation), determining normalized weights based on a weighted sum calculated using the SNR and noise floor ratio values, and generating the single-channel output audio data 255 by applying the normalized weights to the selected beam group.

In some examples, the device 110 may determine beam-specific signal quality metrics corresponding to a minimum noise floor for each beam and use these signal quality metrics to select a beam group and perform beam merging to generate a combined output signal. For example, the device 110 may track a minimum noise floor for each beam over time, determine a highest minimum noise floor across the beams, and determine a noise floor ratio between the beam-specific minimum noise floor and the highest minimum noise floor. Using a combination of the noise floor ratio and signal-to-noise ratio (SNR) values, the device 110 may perform beam selection by prioritizing low background noise as well as high SNR to select a pre-defined beam group. In addition, the device 110 may use the noise floor ratio to perform beam merging and generate single-channel output audio data using the selected beam group. For example, the device 110 may scale the beams based on a combination of the SNR value and the noise floor ratio, such that the combined output includes a percentage of the selected beams based on a weighted sum corresponding to a magnitude of the beam and the relative noise floor.

Figure 3A:
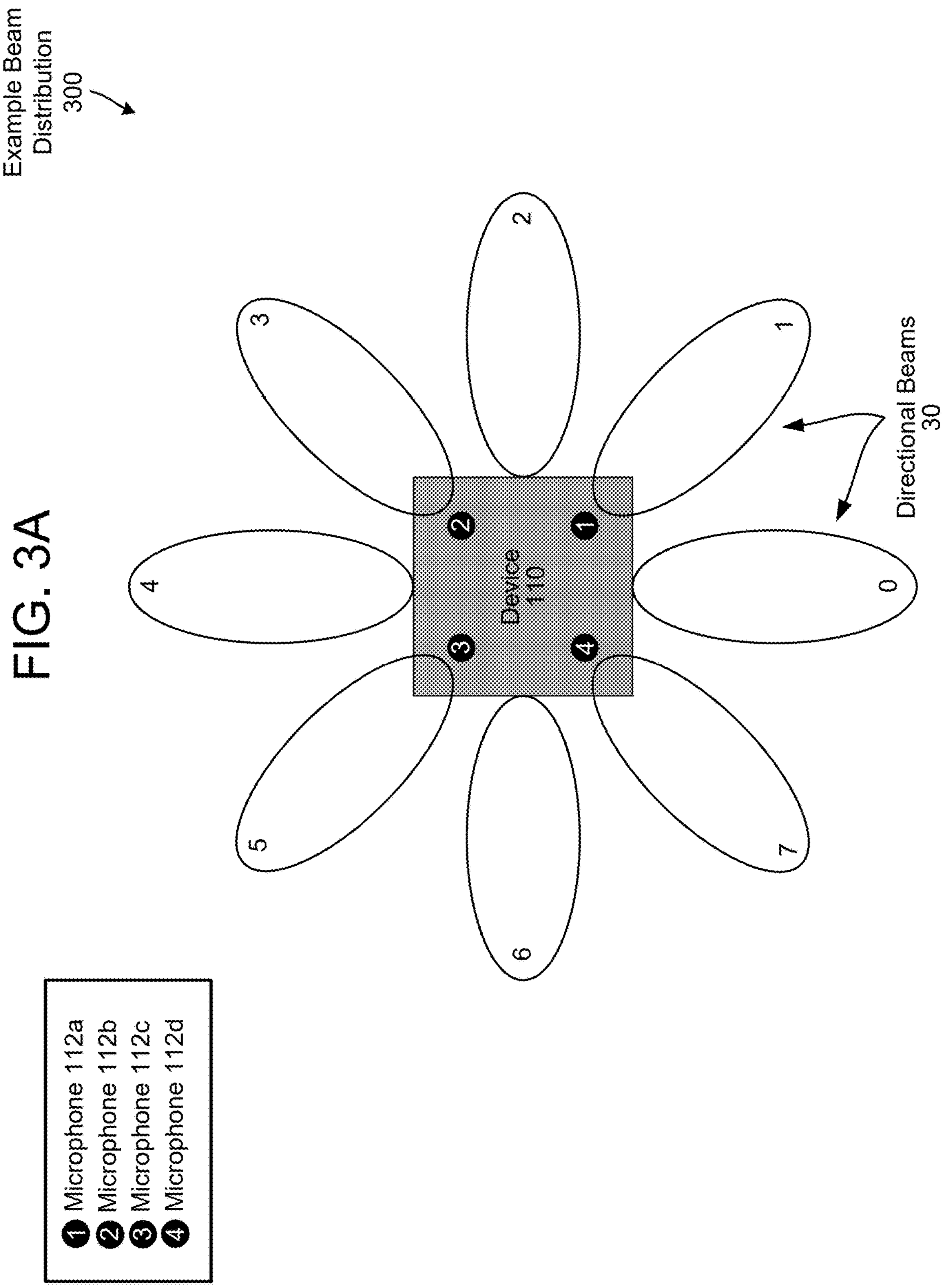
FIGS. 3A-3C illustrate examples of a beam distribution and selecting a target beam or a reference beam according to embodiments of the present disclosure.
Figure 3B:
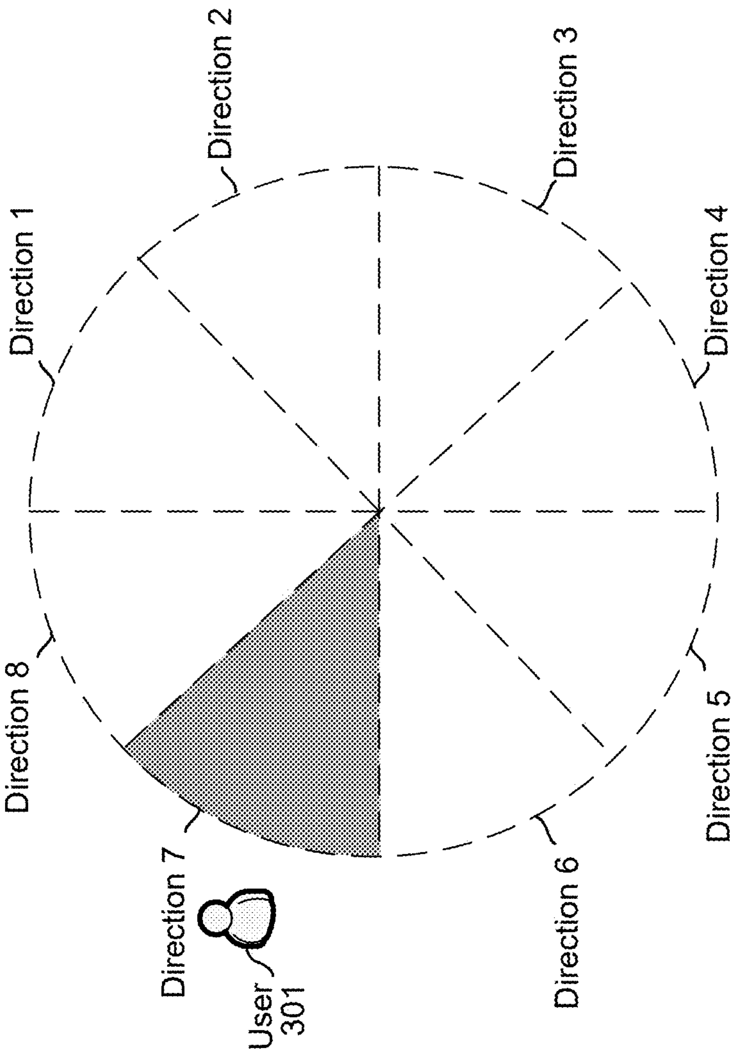
Figure 3C:
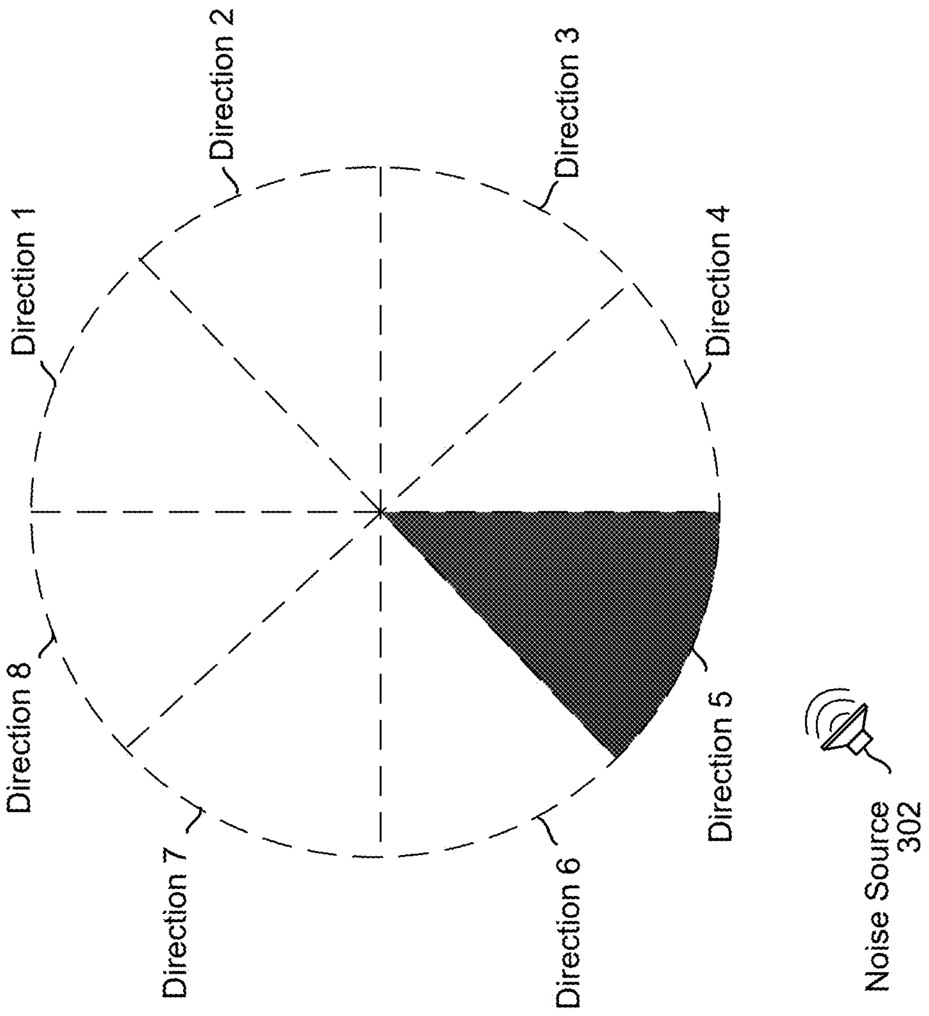

FIGS. 3A-3C illustrate examples of a beam distribution and selecting a target beam or a reference beam according to embodiments of the present disclosure. The device 110 may include multiple microphones 112 configured to capture sound and pass the resulting audio signal created by the sound to a downstream component. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone). Using the direction isolation techniques described above, the device 110 may isolate directionality of audio sources.

As illustrated in FIG. 3A, the device 110 may include a first number (e.g., M) of microphones 112 and may perform beamforming to generate a second number (e.g., N) of directional beams 30. For example, FIG. 3A illustrates an example beam distribution 300 in which the device 110 includes four microphones 112*a*-112*d* and generates eight directional beams 30*a*-30*h* (e.g., directional beams [0, 1, . . . 7]).

In the example illustrated in FIG. 3A, the directional beams 30 are uniformly distributed around the device 110, such that the directional beams 30 cover 360° with a separation of 45°. For example, a first directional beam 30*a* (e.g., "0") extends from a front of the device 110 along a vertical axis, a third directional beam 30*c* (e.g., "2") extends from a first side of the device 110 along a horizontal axis, a fifth directional beam 30*e* (e.g., "4") extends from a back of the device 110 along the vertical axis, and a seventh directional beam 30*g* (e.g., "6") extends from a second side of the device 110 along the horizontal axis. Similarly, a second directional beam 30*b* (e.g., "1") extends from a first corner of the device 110 in a diagonal direction, a fourth directional beam 30*d* (e.g., "3") extends from a second corner of the device 110 in a diagonal direction, a sixth directional beam 30*f* (e.g., "5") extends from a third corner of the device 110 in a diagonal direction, and an eighth directional beam 30*h* (e.g., "7") extends from a fourth corner of the device 110 in a diagonal direction.

While the example beam distribution 300 illustrates an example configuration of the directional beams 30, the disclosure is not limited thereto and the directional beams 30 may be configured differently without departing from the disclosure. For example, the directional beams 30 may be rotated relative to the device 110, such that two directional beams may correspond to each side of the device 110 without departing from the disclosure. Additionally or alternatively, while the example beam distribution 300 illustrates an example configuration in which the device 110 generates eight directional beams, the disclosure is not limited thereto and the device 110 may generate any number of directional beams without departing from the disclosure.

In the example illustrated in FIG. 3B, a particular direction may be associated with azimuth angles divided into bins (e.g., 0-45 degrees, 46-90 degrees, and so forth). To isolate audio from a particular direction, the device 110 may apply a variety of audio filters to the output of the microphones 112 where certain audio is boosted while other audio is dampened, to create isolated audio corresponding to a particular direction, which may be referred to as a beam. While in some examples the number of beams may correspond to the number of microphones 112, the disclosure is not limited thereto and the number of beams may be independent of the number of microphones 112. For example, a two-microphone array may be processed to obtain more than two beams, using filters and beamforming techniques to isolate audio from more than two directions. Thus, the number of microphones 112 may be more than, less than, or the same as the number of beams. The beamformer unit of the device may have an adaptive beamformer (ABF) unit/fixed beamformer (FBF) unit processing pipeline for each beam, although the disclosure is not limited thereto.

In some examples, the device 110 may determine a look-direction associated with speech (e.g., direction corresponding to a user) and select the look-direction as a target beam. For example, the device 110 may detect speech represented in the audio data and perform sound source localization (SSL) or other processing to determine a direction associated with the speech. The device 110 may use various techniques to determine the beam corresponding to the look-direction. For example, the device 110 may use techniques (either in the time domain or in the sub-band domain) such as calculating a signal-to-noise ratio (SNR) for each beam, performing voice activity detection (VAD) on each beam, and/or the like, although the disclosure is not limited thereto. In the example illustrated in FIG. 3B, the device 110 may determine that speech represented in the audio data corresponds to direction 7.

After identifying the look-direction associated with the speech, the device 110 may isolate audio coming from the look-direction using techniques known to the art and/or explained herein. Thus, as shown in FIG. 3B, the device 110 may boost audio coming from direction 7, thus increasing the amplitude of audio data corresponding to speech from user 301 relative to other audio captured from other directions. In this manner, noise from diffuse sources that is coming from all the other directions will be dampened relative to the desired audio (e.g., speech from user 301) coming from direction 7.

One drawback to this approach is that it may not function as well in dampening/canceling noise from a noise source that is not diffuse, but rather coherent and focused from a particular direction (e.g., localized noise source). For example, as shown in FIG. 3C, a noise source 302 may be coming from direction 5 but may be sufficiently loud that noise canceling/beamforming techniques using an FBF unit alone may not be sufficient to remove all the undesired audio coming from the noise source 302, thus resulting in an ultimate output audio signal determined by the device 110 that includes some representation of the desired audio resulting from user 301 (e.g., representation of an utterance) but also some representation of the undesired audio resulting from noise source 302 (e.g., representation of playback audio data).

To remove the representation of the undesired audio from the output audio signal, the device 110 may perform beam cancellation. For example, the device 110 may include an adaptive noise canceller that can remove noise from particular directions using adaptively controlled coefficients which can adjust how much noise is cancelled from particular directions. In some examples, the device 110 may perform beam cancellation to select a fifth directional beam associated with the noise source 302 (e.g., Direction 5) as a reference beam, select a seventh directional beam associated with the desired speech (e.g., Direction 7) as a target beam, and subtract the fifth directional beam from the seventh directional beam to generate the output audio signal. Thus, the output audio signal includes the representation of the desired audio while reducing and/or removing the representation of the undesired audio.

In some examples, the device 110 may determine the look-direction and select the target beam (e.g., directional output) prior to performing beam cancellation to remove the reference beam. For example, the device 110 may perform beam cancellation using a single adaptive filter that is configured to subtract the reference beam from the target beam. However, the disclosure is not limited thereto, and in other examples the device 110 may select the reference beam and perform beam cancellation using every beam as a target beam. For example, the device 110 may perform beam cancellation using N adaptive filters, with each adaptive filter configured to subtract the reference beam from a corresponding target beam (e.g., individual directional beam). Additionally or alternatively, the device 110 may select one or more reference beams for each individual target beam without departing from the disclosure.

Figure 4A:
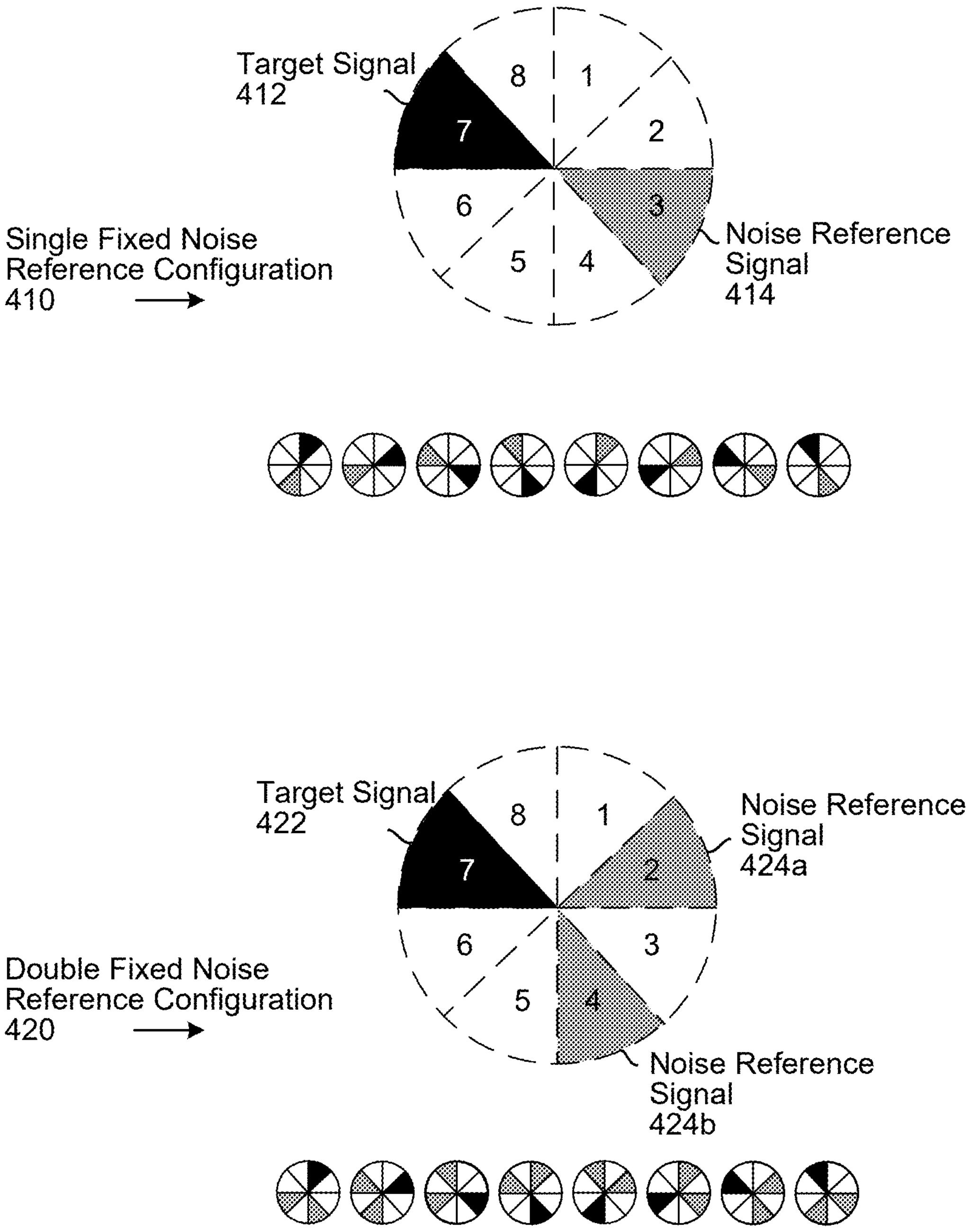
FIGS. 4A-4B illustrate examples of noise reference signals according to embodiments of the present disclosure.
Figure 4B:
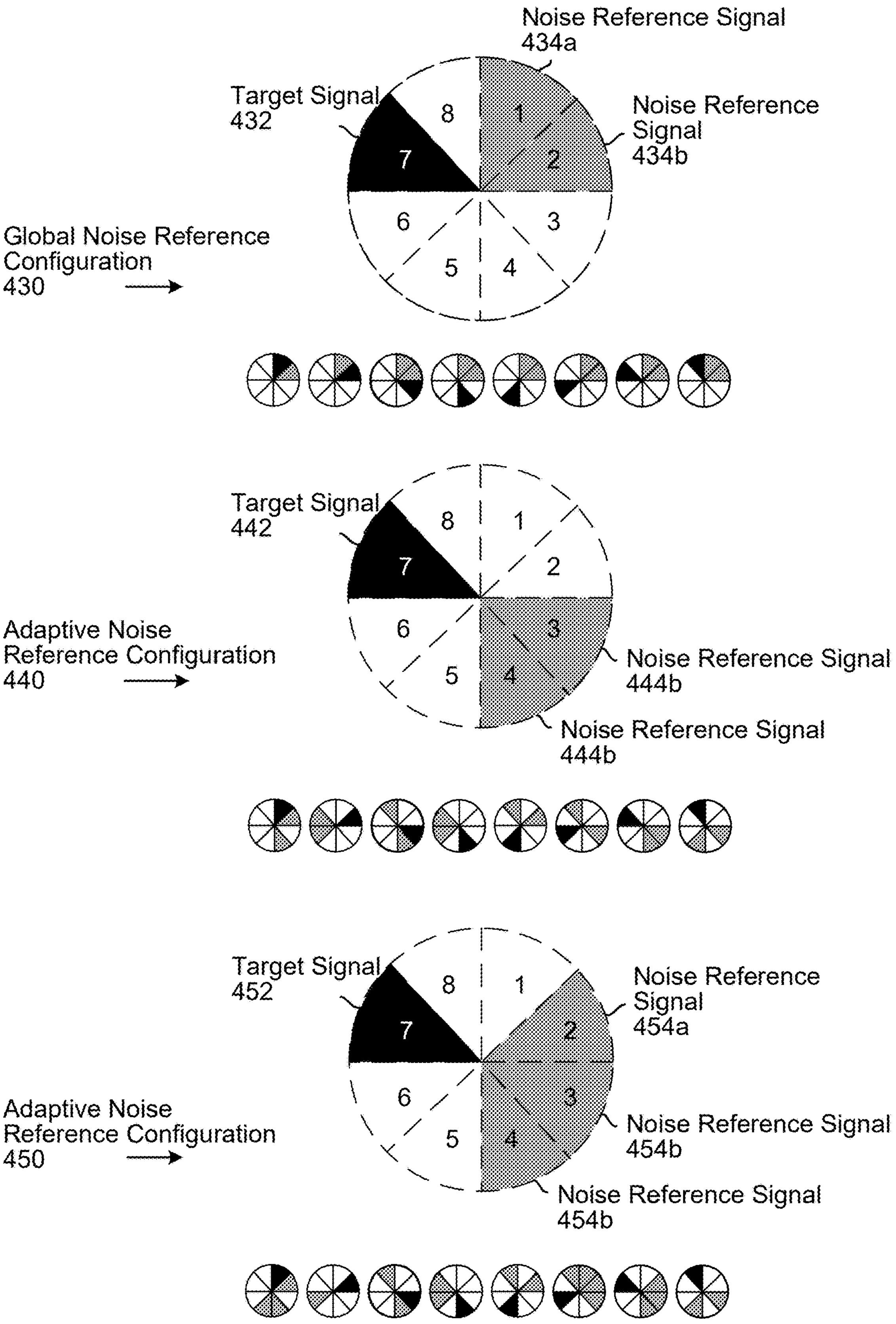

FIGS. 4A-4B illustrate examples of noise reference signals according to embodiments of the present disclosure. As illustrated in FIGS. 4A-4B, the device 110 may determine the noise reference signal(s) using a variety of techniques. In some examples, each directional output may be associated with unique noise reference signal(s). To illustrate an example, the device 110 may determine the noise reference signal(s) using a fixed configuration based on the directional output. For example, the device 110 may select a first directional output (e.g., Direction 1) and may choose a second directional output (e.g., Direction 5, opposite Direction 1 when there are eight beams corresponding to eight different directions) as a first noise reference signal for the first directional output, may select a third directional output (e.g., Direction 2) and may choose a fourth directional output (e.g., Direction 6) as a second noise reference signal for the third directional output, and so on. This is illustrated in FIG. 4A as a single fixed noise reference configuration 410.

As illustrated in FIG. 4A, in the single fixed noise reference configuration 410, the device 110 may select a seventh directional output (e.g., Direction 7) as a target signal 412 and select a third directional output (e.g., Direction 3) as a noise reference signal 414. The device 110 may continue this pattern for each of the directional outputs, using Direction 1 as a target signal and Direction 5 as a noise reference signal, Direction 2 as a target signal and Direction 6 as a noise reference signal, Direction 3 as a target signal and Direction 7 as a noise reference signal, Direction 4 as a target signal and Direction 8 as a noise reference signal, Direction 5 as a target signal and Direction 1 as a noise reference signal, Direction 6 as a target signal and Direction 2 as a noise reference signal, Direction 7 as a target signal and Direction 3 as a noise reference signal, and Direction 8 as a target signal and Direction 4 as a noise reference signal.

As an alternative, the device 110 may use a double fixed noise reference configuration 420. For example, the device 110 may select the seventh directional output (e.g., Direction 7) as a target signal 422 and may select a second directional output (e.g., Direction 2) as a first noise reference signal 424*a* and a fourth directional output (e.g., Direction 4) as a second noise reference signal 424*b*. The device 110 may continue this pattern for each of the directional outputs, using Direction 1 as a target signal and Directions 4/6 as noise reference signals, Direction 2 as a target signal and Directions 5/7 as noise reference signals, Direction 3 as a target signal and Directions 6/8 as noise reference signals, Direction 4 as a target signal and Directions 7/9 as noise reference signal, Direction 5 as a target signal and Directions 8/2 as noise reference signals, Direction 6 as a target signal and Directions 1/3 as noise reference signals, Direction 7 as a target signal and Directions 2/4 as noise reference signals, and Direction 8 as a target signal and Directions 3/5 as noise reference signals.

While the double fixed noise reference configuration 420 illustrates an example in which the reference signals correspond to non-adjacent directional beams (e.g., discontinuous reference beams), the disclosure is not limited thereto. In some examples, the device 110 may select reference signals that correspond to multiple adjacent directional beams (e.g., continuous reference beams) without departing from the disclosure. For example, the device 110 may select the seventh directional output (e.g., Direction 7) as a target signal 422 and may select a second directional output (e.g., Direction 2) as a first noise reference signal 424*a*, a third directional output (e.g., Direction 3) as a second noise reference signal 424*b*, and a fourth directional output (e.g., Direction 4) as a third noise reference signal 424*c* without departing from the disclosure. However, the disclosure is not limited thereto, and a first number of directional beams included as reference signals, a second number of directional beams ignored as reference signals, and/or the like may vary without departing from the disclosure.

Additionally or alternatively, instead of removing the center beam (e.g., Direction 3) as illustrated in the double fixed noise reference configuration 420, the device 110 may associate the center beam with a reduced weight relative to the side beams without departing from the disclosure. For example, the device 110 may associate the second directional output (e.g., Direction 2) and the fourth directional output (e.g., Direction 4) with a first weight (e.g., $w_1=0.4$), while associating the third noise reference signal 424*c* with a second weight (e.g., $w_2=0.2$), although the disclosure is not limited thereto. In some examples, the discontinuous reference beams can be implemented by setting the second weight to a value of zero without departing from the disclosure.

While FIG. 4A illustrates using a fixed configuration to determine noise reference signal(s), the disclosure is not limited thereto. FIG. 4B illustrates examples of the device 110 selecting noise reference signal(s) differently for each target signal. As a first example, the device 110 may use a global noise reference configuration 430. For example, the device 110 may select the seventh directional output (e.g., Direction 7) as a target signal 432 and may select the first directional output (e.g., Direction 1) as a first noise reference signal 434*a* and the second directional output (e.g., Direction 2) as a second noise reference signal 434*b*. The device 110 may use the first noise reference signal 434*a* and the second noise reference signal 434*b* for each of the directional outputs (e.g., Directions 1-8).

As a second example, the device 110 may use an adaptive noise reference configuration 440, which selects two directional outputs as noise reference signals for each target signal. For example, the device 110 may select the seventh directional output (e.g., Direction 7) as a target signal 442 and may select the third directional output (e.g., Direction 3) as a first noise reference signal 444*a* and the fourth directional output (e.g., Direction 4) as a second noise reference signal 444*b*. However, the noise reference signals may vary for each of the target signals, as illustrated in FIG. 4B.

As a third example, the device 110 may use an adaptive noise reference configuration 450, which selects one or more directional outputs as noise reference signals for each target signal. For example, the device 110 may select the seventh directional output (e.g., Direction 7) as a target signal 452 and may select the second directional output (e.g., Direction 2) as a first noise reference signal 454*a*, the third directional output (e.g., Direction 3) as a second noise reference signal 454*b*, and the fourth directional output (e.g., Direction 4) as a third noise reference signal 454*c*. However, the noise reference signals may vary for each of the target signals, as illustrated in FIG. 4B, with a number of noise reference signals varying between one (e.g., Direction 6 as a noise reference signal for Direction 2) and four (e.g., Directions 1-3 and 8 as noise reference signals for Direction 6).

In some examples, the device 110 may determine a number of noise references based on a number of dominant audio sources. For example, if someone is talking while music is playing over loudspeakers and a blender is active, the device 110 may detect three dominant audio sources (e.g., talker, loudspeaker, and blender) and may select one dominant audio source as a target signal and two dominant audio sources as noise reference signals. Thus, the device 110 may select first audio data corresponding to the person speaking as a first target signal and select second audio data corresponding to the loudspeaker and third audio data corresponding to the blender as first reference signals. Similarly, the device 110 may select the second audio data as a second target signal and the first audio data and the third audio data as second reference signals, and may select the third audio data as a third target signal and the first audio data and the second audio data as third reference signals.

Additionally or alternatively, the device 110 may track the noise reference signal(s) over time. For example, if the music is playing over a portable loudspeaker that moves around the room, the device 110 may associate the portable loudspeaker with a noise reference signal and may select different portions of the beamformed audio data based on a location of the portable loudspeaker. Thus, while the direction associated with the portable loudspeaker changes over time, the device 110 selects beamformed audio data corresponding to a current direction as the noise reference signal.

While some of the examples described above refer to determining instantaneous values for a signal quality metric (e.g., a signal-to-interference ratio (SIR), a signal-to-noise ratio (SNR), or the like), the disclosure is not limited thereto. Instead, the device 110 may determine the instantaneous values and use the instantaneous values to determine average values for the signal quality metric. Thus, the device 110 may use average values or other calculations that do not vary drastically over a short period of time in order to select which signals on which to perform additional processing. For example, a first audio signal associated with an audio source (e.g., person speaking, loudspeaker, etc.) may be associated with consistently strong signal quality metrics (e.g., high SIR/SNR) and intermittent weak signal quality metrics. The device 110 may average the strong signal metrics and the weak signal quality metrics and continue to track the audio source even when the signal quality metrics are weak without departing from the disclosure.

Figure 5:
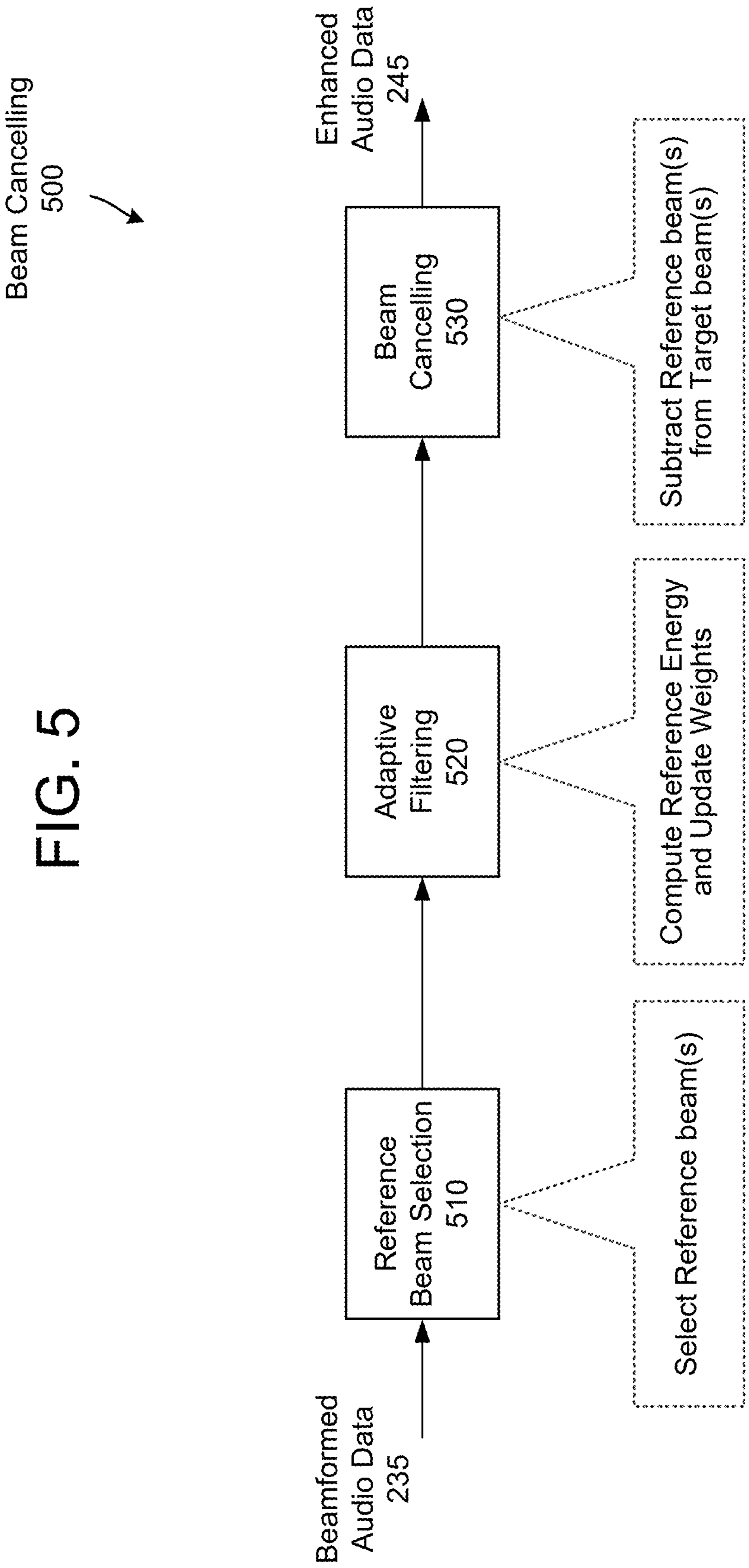
FIG. 5 illustrates a component diagram for performing beam cancelling according to embodiments of the present disclosure.

FIG. 5 illustrates a component diagram for performing beam cancelling according to embodiments of the present disclosure. As illustrated in FIG. 5, the device 110 may perform beam cancelling 500 using a reference beam selection component 510, an adaptive filtering component 520, and a beam cancelling component 530.

As illustrated in FIG. 5, the reference beam selection component 510 may receive beamformed audio data 235 and may select one or more reference beam(s), as will be described in greater detail below. For example, the device 110 may dynamically select reference beams for each target beam based on a combination of geometry and/or reference power levels. In some examples, the device 110 may select a first portion of the reference beams based on a known configuration and a location of the target beam. For example, the device 110 may select one or more reference beams that are opposite the target beam, such that the selected reference beams are unique for each individual target beam. Examples include the single fixed noise reference configuration 410, the double fixed noise reference configuration 420, and/or the like, which were described in greater detail above with regard to FIG. 4A. Additionally or alternatively, the device 110 may dynamically select a second portion of the reference beams to include noise sources associated with high noise levels. For example, the device 110 may identify one or more directions associated with high noise levels and may use these as reference beams for multiple target beams. In some examples, the device 110 may exclude one or more directions associated with high noise levels as reference beams to create spatial separation between the desired speech and the reference beams.

The adaptive filtering component 520 may receive the selected reference beam(s) and may compute reference energy and update weights. For example, the adaptive filtering component 520 may use a step-size value to perform adaptation and update adaptive filter coefficient values of a first adaptive filter. Additionally or alternatively, the adaptive filtering component 520 may process the selected reference beam(s) to generate noise reference signals using the first adaptive filter. Thus, the beam cancelling component 530 may subtract the reference beam(s) (e.g., noise reference signals output by the first adaptive filter) from the target beam(s) to generate enhanced audio data 245. For example, the beam cancelling component 530 may generate a multi-channel output, such that the enhanced audio data 245 includes a separate channel for each of the target beams included in the beamformed audio data 235.

Figure 6:
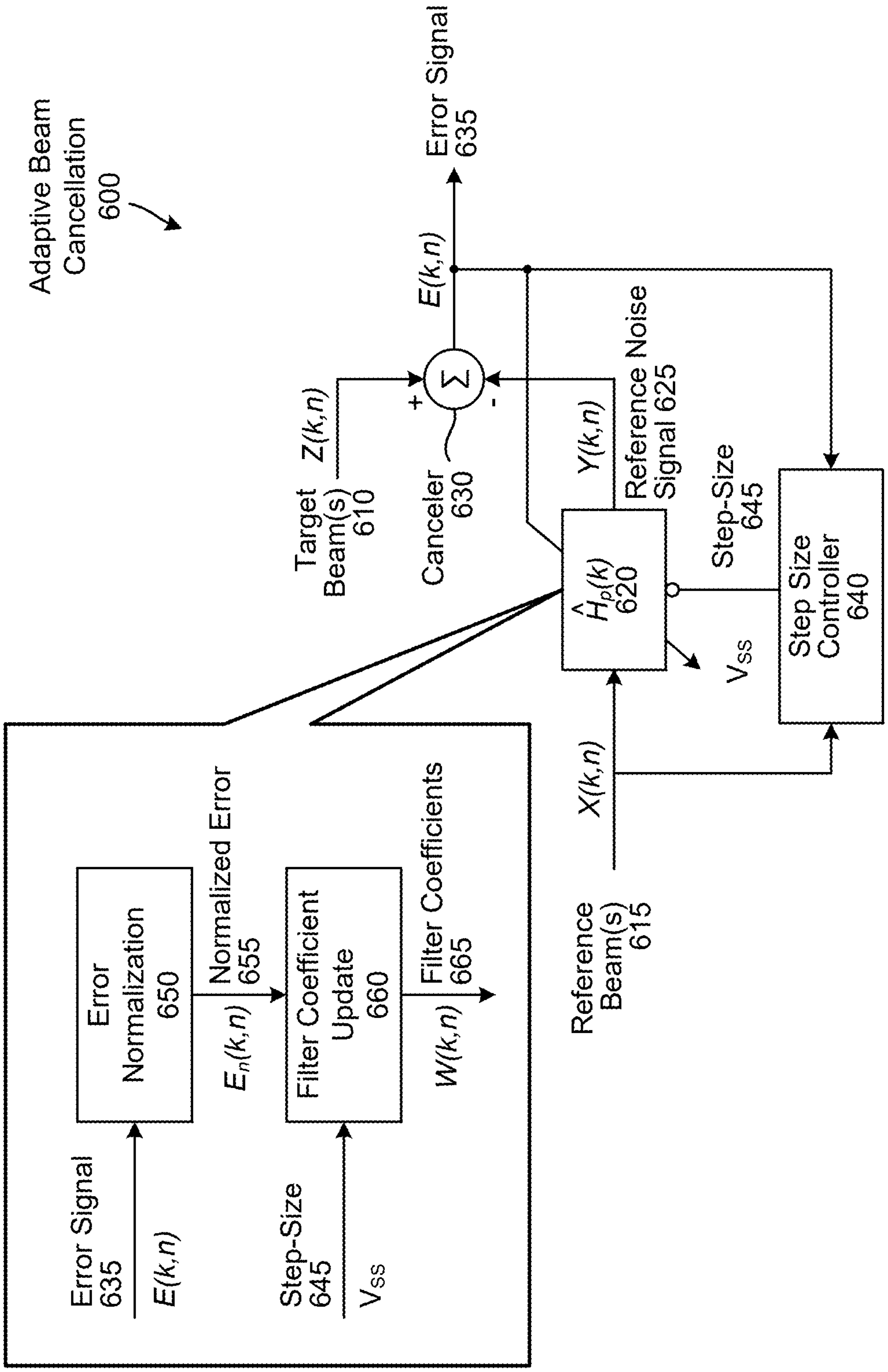
FIG. 6 illustrates a component diagram for performing adaptive beam cancellation according to embodiments of the present disclosure.

FIG. 6 illustrates a component diagram for performing adaptive beam cancellation according to embodiments of the present disclosure. As illustrated in FIG. 6, the system 100 may perform adaptive beam cancellation 600 using target beam(s) Z(k, n) 610 (e.g., target audio signal(s)) and reference beam(s) X(k,n) 615 (e.g., reference audio signal(s)). An estimated transfer function $\hat{H}_p$ (k) 620 may correspond to a first plurality of adaptive filter coefficient values associated with a first adaptive filter and the system 100 may use the first plurality of adaptive filter coefficient values to process the reference beam(s) X(k, n) 615 and generate a reference noise signal Y(k, n) 625. To perform beam cancellation, the system 100 may subtract the reference noise signal Y(k, n) 625 from the target beam(s) Z(k, n) 610 to generate an error signal E(k, n) 635.

For ease of illustration, FIG. 6 illustrates an example of performing beam cancellation involving a single target beam Z(k, n) 610 and a single reference beam X(k, n) 615. However, the disclosure is not limited thereto and the components and/or steps illustrated in FIG. 6 may be repeated for two or more reference beams X(k, n) 615 and/or two or more target beams Z(k, n) 610 without departing from the disclosure.

As illustrated in FIG. 6, in some examples the system 100 may perform beam cancellation in the subband domain, which helps the system 100 exert both time and frequency dependent adaptation controls. For example, the audio signals are represented in FIG. 6 with reference to a tone index k and a frame index n (e.g., X(k, n), Y(k, n), Z(k, n), E(k, n)). However, the disclosure is not limited thereto and the system 100 may perform one or more steps associated with echo cancellation in the time domain (e.g., represented as x(n), y(n), z(n), e(n)) and/or the frequency domain without departing from the disclosure.

As the system 100 performs beam cancellation in the subband domain, the system 100 may determine the reference noise signal Y(k, n) 625 using an adaptive filter coefficients weight vector:

$$\underline{W_p}(k,n) \triangleq \left[W_p^0(k,n)W_p^1(k,n)\ \cdots\ W_p^{L-1}(k,n)\right] \quad [1]$$

where p denotes a beam index associated with the reference beam(s) X(k, n) 615 (e.g., individual directional output or beamformed audio signal), k denotes a tone index (e.g., frequency bin, subband bin, etc.), n denotes a frame index (e.g., group of samples), L denotes a length of the room impulse response (RIR), and $$W_p^l(k, n)$$

denotes a particular weight value at the pth beam index for the kth tone, the nth frame, and the lth time step.

Using the adaptive filter coefficients weight vector $W_p$ (k, n), the system 100 may determine the reference noise signal Y(k, n) 625 using the following equation:

$$Y_p(k, n) = \sum_{r=0}^{L-1} X_p(k, n-r) W_p^r(k, n) \quad [2]$$

where $Y_p$ (k, n) is the reference noise signal of the pth beam index for the kth tone index and nth frame index, $X_p$ (k, n) is the reference beam (e.g., reference signal) for the pth beam index, and $$W_p^r(k, n)$$

denotes the adaptive filter coefficients weight vector.

During conventional processing, the weight vector can be updated according to a subband normalized least mean squares (NLMS) algorithm:

$$W_p(k, n) = W_p(k, n-1) + \mu_p(k, n) \cdot \frac{X_p(k, n)}{\|X_p(k, n)\|^2 + \xi} \cdot E*(k, n) \quad [3]$$

where $W_p$ (k, n) denotes an adaptive filter coefficients weight vector for the pth beam index, kth tone index, and nth frame index, $\mu_p$ (k, n) denotes an adaptation step-size value, $X_p$(k, n) denotes the reference beam(s) X(k, n) 615 (e.g., reference signal) for the pth beam index, $\|X_p(k, n)\|$ denotes a vector norm (e.g., vector length, such as a Euclidian norm) associated with the reference beam(s) X(k, n) 615, λ is a nominal value to avoid dividing by zero (e.g., regularization parameter), and E*(k, n) denotes a conjugate of the error signal 635 output by the canceler 630.

As described in greater detail below, the system 100 may adapt the first adaptive filter by updating the first plurality of filter coefficient values to a second plurality of filter coefficient values using the error signal 635. For example, the system 100 may update the weight vector associated with the first adaptive filter in order adjust the reference noise signal Y(k, n) 625 and minimize the error signal 635. Applying such adaptation over time (i.e., over a series of samples), it follows that the error signal 635 should eventually converge to zero for a suitable choice of the step-size $V_{ss}$ (k, n) in the absence of ambient noises or near-end signals. The rate at which the system 100 updates the first adaptive filter is proportional to the step-size values $V_{ss}$ (k, n). If a step-size value $V_{ss}$ (k, n) is closer to one or greater than one, the adjustment is larger, whereas if the step-size value $V_{ss}$ (k, n) is closer to zero, the adjustment is smaller.

When a near-end signal (e.g., near-end speech or other audible sound that doesn't correspond to the playback signal) is present, however, the system 100 should output the near-end signal, which requires that the system 100 not update the first adaptive filter quickly enough to cause the adaptive filter to diverge from a converged state (e.g., cancel the near-end signal). For example, the near-end signal may correspond to near-end speech, which is a desired signal and the system 100 may process the near-end speech and/or output the near-end speech to downstream components for speech processing or the like. Alternatively, the near-end signal may correspond to an impulsive noise, which is not a desired signal but passes quickly, such that adapting causes the beam cancellation to diverge from a steady state condition.

To improve beam cancellation, the system 100 may control an adaptation speed of the first adaptive filter by dynamically determining the step-size values $V_{ss}$(k, n) and/or performing error normalization to limit the rate of adaptation. As illustrated in FIG. 6, the system 100 may determine step-size values $V_{ss}$(k, n) 645 using a step-size controller component 640 according to embodiments of the present disclosure. As will be described in greater detail below with regard to FIGS. 7-8, the system 100 may determine the step-size values $V_{ss}$(k, n) 645 using a combination of a microphone step-size value $V_{ss\text{-}Mics}$(k, n) and an SNR step-size value $V_{ss\text{-}SNR}$(k, n). For example, the system 100 may multiply a microphone step-size value $V_{ss\text{-}Mics}$(k, n) and an SNR step-size value $V_{ss\text{-}SNR}$(k, n) to calculate a scalar value and then map the scalar value to a step-size value $V_{ss}$(k, n) 645 (e.g., using a sigmoid curve or the like) without departing from the disclosure. However, the disclosure is not limited thereto, and in other examples the system 100 may map the microphone step-size value $V_{ss\text{-}Mics}$(k, n) to a first scalar value (e.g., using a first sigmoid curve), map the SNR step-size value $V_{ss\text{-}SNR}$(k, n) to a second scalar value (e.g., using a second sigmoid curve), and then calculate the step-size value $V_{ss}$(k, n) 645 using the first scalar value and the second scalar value, although the disclosure is not limited thereto.

In some examples, a step-size value $V_{ss}$(k, n) 645 may only be relatively high (e.g., $0.5 \le V_{ss}(k, n) \le 1.0$) when the microphone step-size value $V_{ss\text{-}Mics}$(k, n) is a relatively high value. For example, if the microphone step-size value $V_{ss\text{-}Mics}$(k, n) is low, a corresponding step-size value $V_{ss}$(k, n) 645 is therefore low and the first adaptive filter adapts slowly. Thus, the first adaptive filter adapts quickly only when the microphone step-size value $V_{ss\text{-}Mics}$(k, n) is relatively high (e.g., indicating that the microphone signal level is near an upper boundary of recent microphone values), to avoid the first adaptive filter diverging due to low power signals. Therefore, the microphone step-size value $V_{ss\text{-}Mics}$ (k, n) prevents the first adaptive filter from diverging due to low level signals represented in the microphone signal(s) y(n).

As illustrated in FIG. 6, the step-size controller component 640 may receive the reference beam(s) X(k,n) 615 and the error signal 635 and may determine the step-size values $V_{ss}$(k, n) 645.

Figure 7:
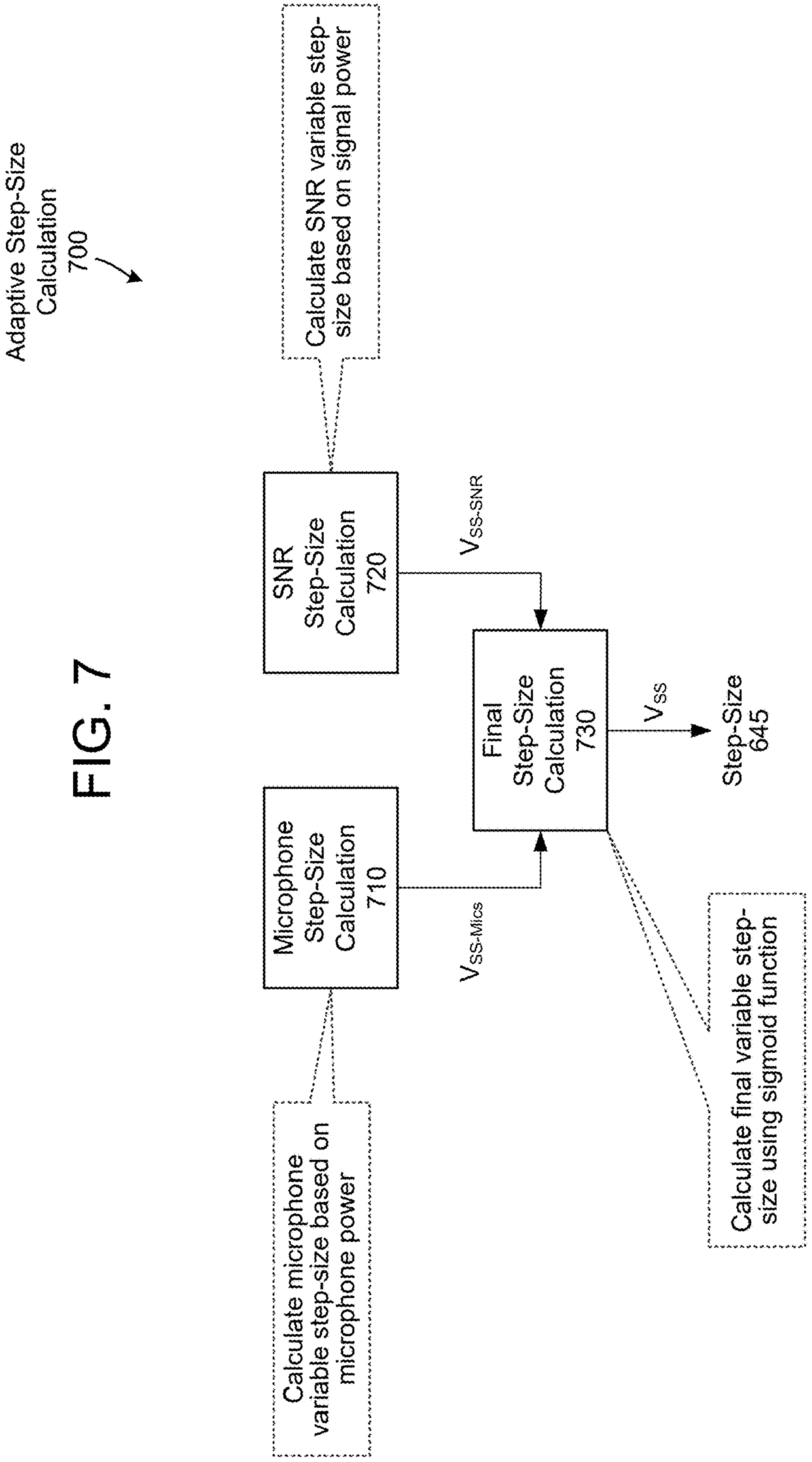
FIG. 7 illustrates a component diagram for performing adaptive step-size calculation according to embodiments of the present disclosure.

FIG. 7 illustrates a component diagram for performing adaptive step-size calculation according to embodiments of the present disclosure. As illustrated in FIG. 7, the device 110 may perform adaptive step-size calculation 700 using a microphone step-size calculation component 710, an SNR step-size calculation component 720, and a final step-size calculation component 730. For example, the microphone step-size calculation component 710 may be configured to calculate a microphone variable step-size value $V_{ss\text{-}Mics}$ based on the microphone power, while the SNR step-size calculation component 720 may be configured to calculate the SNR variable step-size value $V_{ss\text{-}SNR}$ based on a signal power. Finally, the final step-size calculation component 730 may use both the microphone variable step-size value $V_{ss\text{-}Mics}$ and the SNR variable step-size value $V_{ss\text{-}SNR}$ to calculate the final variable step-size value $V_{ss}$ using a sigmoid function, as described in greater detail below with regard to FIG. 8.

In order to calculate the SNR variable step-size based on signal power, in some examples the SNR step-size calculation component 720 may determine SNR values associated with an individual beam i and frequency band k. The device 110 may determine the SNR value using:

$$SNR = \frac{P_s}{P_n} \quad [4]$$

where the SNR value is calculated for a predefined frequency range (e.g., range of subbands) for a given signal $Y_i(n, k)$ at a given frame index n and tone index k (e.g., frequency index). For example, the signal $Y_i(n, k)$ may correspond to an individual beam from the enhanced audio data 245. Where $S_i(n, k)$ is the instantaneous power of the given signal:

$$S_i(n, k) = |Y_i(n, k)^2| \quad [5]$$

the device 110 may calculate an average power value across the predefined frequency range (e.g., range of subbands) using:

$$Q_i(n) = \sum_{k=startBand}^{stopBand} S_i(n, k) \quad [6]$$

The device 110 may measure the per signal power using a moving average, such as:

$$P_s(n) = \lambda * P_s(n-1) + (1-\lambda) * Q_i(n),\ \lambda \in [0.75, 0.999] \quad [7]$$

where $P_s(n)$ indicates the signal power for the i-th directional beam and frame index n, $\lambda$ is a smoothing parameter, $P_s(n-1)$ indicates the signal power for the i-th directional beam and a previous frame index n−1, and $Q_i(n)$ indicates the average power value across the predefined frequency range for the i-th directional beam and frame index n.

The device 110 may select a fast smoothing parameter $\lambda_{fast}$ when speech is present in the enhanced audio data 245 and may select a slow smoothing parameter $\lambda_{slow}$ when speech is not present. For example, the fast smoothing parameter $\lambda_{fast}$ may correspond to a first range of values [0.75, 0.85], whereas the slow smoothing parameter $\lambda_{slow}$ may correspond to a second range of values [0.95, 0.999].

$$Q_i(n) > 1.02 * P_s(n) \quad [8]$$

The device 110 may calculate a minimum noise estimate using noise power $P_n(n)$ that is calculated similar to the signal power $P_s(n)$ using the slow smoothing parameter $\lambda_{slow}$.

$$P_{min} = \min(P_n, \max(N_{adapt} * P_{min}, P_{min} + minNoise)) \quad [9]$$

where $P_{min}$ indicates a minimum noise power, $P_n$ denotes the noise power calculated using the slow smoothing parameter $\lambda_{slow}$, $N_{adapt}$ denotes a noise adaptation value, and minNoise denotes a minimum noise value. The device 110 may measure the noise power $P_n(n)$ when a wakeword (WW) is not detected and background noise power measurement may be frozen when speech is detected (e.g., the wakeword and/or an utterance).

The device 110 may calculate a background noise power measurement by estimating the minimum noise power during a first time window (e.g., length of $T_{sec}$). In some examples, the device 110 may store minimum noise power values $P_{min}$ in a buffer having a buffer duration equal to the first time window (e.g., $T_{sec}$) and may determine a current minimum noise power using the buffer. For example, the device 110 may calculate a slow moving average power for each frame and store these slow moving average power values in a circular buffer (e.g., NoiseBuffer), such that:

$$P_{currentmin} = \min(NoiseBuffer) \quad [10]$$

where $P_{currentmin}$ indicates the current minimum noise power value associated with a current frame.

The value of the current minimum noise power value (e.g., $P_{currentmin}$) may correspond to a minimum noise power measured during the first time window (e.g., $T_{sec}$). In some examples, the device 110 may use the current minimum noise power value as a noise power to calculate the SNR values (e.g., instead of using the noise power $P_n$ described above):

$$SNR = \frac{P_s}{P_{currentmin}} \quad [11]$$

FIG. 8 illustrates examples of determining step-size parameters according to embodiments of the present disclosure. As described above, the system 100 may control an adaptation speed of the first adaptive filter by dynamically determining the step-size values $V_{ss}(k, n)$. For example, the system 100 may determine variable step-size values $V_{ss}(k, n)$ 830 using a combination of microphone variable step-size values $V_{ss\text{-}Mics}(k, n)$ 810 and SNR variable step-size values $V_{ss\text{-}SNR}(k, n)$ 820.

As illustrated in FIG. 8, the system 100 may determine the microphone variable step-size values $V_{ss\text{-}Mics}(k, n)$ 810. For example, the system 100 may monitor a microphone signal y(n) corresponding to an individual microphone 112 for a fixed time window and determine a microphone range (e.g., first range of power values), which may comprise a lower boundary (e.g., $P_{Mlow}$) and an upper boundary (e.g., $P_{Mhigh}$). The system 100 may determine a microphone variable step-size value $V_{ss\text{-}Mics}(k, n)$ by comparing a current power value (e.g., $P_{mic}$) of the microphone signal y(n) in the time domain to the microphone range. Thus, the adaptation step-size values indicate a relative strength of the microphone signal y(n) at a particular moment in time relative to the first range of power values detected within the fixed time window (e.g., first duration of time).

As illustrated in FIG. 8, the system 100 may determine the microphone variable step-size values $V_{ss\text{-}Mics}(k, n)$ 810 as shown below:

$$V_{ss-Mics} = \frac{P_{mic} - P_{Mlow}}{P_{Mhigh} - P_{Mlow}} \quad [12]$$

where $V_{ss\text{-}Mics}$ denotes adaptation step-size values associated with an individual microphone 112 (e.g., one or more vectors of adaptation step-size values), $P_{Mlow}$ and $P_{Mhigh}$ represent a lower boundary and an upper boundary (e.g., first range of power values) associated with a microphone signal corresponding to the individual microphone 112, and $P_{mic}$ represents a current power value of the microphone signal (e.g., instantaneous power). Thus, the adaptation step-size values indicate a relative strength of the microphone signal at a particular moment in time relative to the first range of power values detected within a fixed time window (e.g., first duration of time).

To improve performance, in some examples the system 100 may restrict the variable microphone step-size parameter $V_{ss\text{-}Mics}$ within a desired range (e.g., $0 \le V_{ss\text{-}Mics}(k,n) \le 1$):

$$V_{ss-Mics} = \min(1, V_{ss-Mics}) \quad [13]$$
$$V_{ss-Mics} = \max(0, V_{ss=Mics})$$

Thus, the system 100 bounds the microphone step-size parameter $V_{ss\text{-}Mics}$ within a range between zero and one (e.g., $0 \le V_{ss\text{-}Mics} \le 1$), such that the microphone step-size parameter $V_{ss\text{-}Mics}$ is equal to zero (e.g., $V_{ss\text{-}Mics}=0$) when the current microphone power is less than or equal to the microphone lower boundary (e.g., $P_{mic} \le P_{Mlow}$) and equal to one (e.g., $V_{ss\text{-}Mics}=1$) when the current microphone power is greater than or equal to the microphone upper boundary (e.g., $P_{mic} \ge P_{Mhigh}$).

For ease of illustration, FIG. 8 and Equation illustrate a generalized form of the adaptation step-size values $V_{ss\text{-}Mics}$ associated with an individual microphone 112. For example, as the adaptation step-size value $V_{ss\text{-}Mics}$ is generated in the time-domain, a single step-size value may apply to every tone index in the subband domain and/or the frequency domain. However, the disclosure is not limited thereto and the system 100 may refer to individual adaptation step-size values and/or vectors of adaptation step-size values without departing from the disclosure. For example, $V_{ss\text{-}Mics:m}(k, n)$ denotes microphone step-size values associated with the kth tone index (e.g., frequency bin), nth frame index (e.g., group of samples), and mth channel index (e.g., individual microphone 112) included in the microphone signal(s) Y(k,n). Alternatively, $V_{ss\text{-}Mics:m}(n)$ denotes microphone step-size values associated with the nth frame index and the mth channel index, which may be shared across all of the tone indexes without departing from the disclosure.

Similarly, the system 100 may determine the SNR variable step-size values $V_{ss\text{-}SNR}(k, n)$ 820 as shown below:

$$V_{ss-SNR} = \frac{A}{1 + B * SNR} \quad [14]$$
$$V_{ss-SNR} = \min(1, V_{ss-SNR})$$

where SNR denotes a signal-to-noise ratio (SNR) value, A and B are adjustable parameters, and $V_{ss\text{-}SNR}$ denotes adaptation step-size values (e.g., one or more vectors of adaptation step-size values) determined based on the SNR value. In some examples, the first adjustable parameter A can be set to a first value (e.g., A=1.021) and the second adjustable parameter B can be set to a second value (e.g., B=0.21), although the disclosure is not limited thereto.

For ease of illustration, FIG. 8 illustrates a generalized form of the SNR adaptation step-size values $V_{ss\text{-}SNR}$. However, the disclosure is not limited thereto and the system 100 may refer to individual adaptation step-size values and/or vectors of adaptation step-size values without departing from the disclosure. For example, $V_{ss\text{-}SNR:p}(k, n)$ denotes reference step-size values associated with the kth tone index (e.g., frequency bin), nth frame index (e.g., group of samples), and pth beam index. Alternatively, $V_{ss\text{-}SNR:p}(n)$ denotes microphone step-size values associated with the nth frame index and the pth beam index.

To improve performance, in some examples the system 100 may restrict the variable SNR step-size parameter $V_{ss\text{-}SNR}$ within a desired range (e.g., $0 \le V_{ss\text{-}SNR}(k, n) \le 1$), as illustrated in FIG. 8. Thus, the system 100 bounds the reference step-size parameter $V_{ss\text{-}SNR}$ within a range between zero and one (e.g., $0 \le V_{ss\text{-}SNR} \le 1$), such that the reference step-size parameter $V_{ss\text{-}SNR}$ is equal to zero (e.g., $V_{ss\text{-}SNR}=0$) when the current reference power is less than or equal to the reference lower boundary (e.g., $P_{ref} \le P_{Rlow}$) and equal to one (e.g., $V_{ss\text{-}SNR}=1$) when the current reference power is greater than or equal to the reference upper boundary (e.g., $P_{ref} \ge P_{Rhigh}$).

Finally, the system 100 may determine the final variable step-size values $V_{ss}(k, n)$ 830 using a combination of the microphone variable step-size values $V_{ss\text{-}Mics}(k, n)$ 810 and the SNR variable step-size values $V_{ss\text{-}SNR}(k, n)$ 820. As illustrated in FIG. 8, in some examples the system 100 may determine the final variable step-size values $V_{ss}(k, n)$ 830 by multiplying the microphone variable step-size values $V_{ss\text{-}Mics}(k, n)$ 810 and the SNR variable step-size values $V_{ss\text{-}SNR}(k, n)$ 820. For example, the system 100 may multiply the microphone step-size value $V_{ss\text{-}Mics}(k, n)$ and the SNR step-size value $V_{ss\text{-}SNR}(k, n)$ to calculate a scalar value and then map the scalar value to a step-size value $V_{ss}(k, n)$ using a sigmoid curve or the like, as shown below:

$$V_{ss} = \text{sigmoid}(V_{ss-Mics} * V_{ss-SNR}) \quad [15.1]$$

where $V_{ss\text{-}Mics}$ denotes first adaptation step-size values associated with the microphone(s) 112, $V_{ss\text{-}SNR}$ denotes second adaptation step-size values corresponding to the SNR values, and $V_{ss}$ denotes third adaptation step-size values (e.g., step-size values 645) received by the first adaptive filter.

However, the disclosure is not limited thereto, and in other examples the system 100 may map the microphone step-size value $V_{ss\text{-}Mics}(k, n)$ to a first scalar value (e.g., using a first sigmoid curve), map the reference step-size value $V_{ss\text{-}SNR}(k, n)$ to a second scalar value (e.g., using a second sigmoid curve), and then calculate the final step-size value $V_{ss}(k, n)$ using the first scalar value and the second scalar value, although the disclosure is not limited thereto. Additionally or alternatively, the system 100 may determine the final variable step-size values $V_{ss}(k, n)$ by processing the microphone variable step-size values $V_{ss\text{-}Mics}(k, n)$ 810 and the reference variable step-size values $V_{ss\text{-}SNR}(k, n)$ 820 using any technique known to one of skill in the art without departing from the disclosure.

In some examples, Equation [15.1] can be rewritten as:

$$V_{ss:m\cdot p}(k, n) = \text{sigmoid}(V_{ss-Mics:m}(k, n) V_{ss-SNR:p}(k, n)) \quad [15.2]$$

where k denotes a tone index, n denotes a frame index, $V_{ss\text{-}Mics:m}$(k, n) denotes microphone step-size values associated with the mth channel index (e.g., individual microphone 112) included in the microphone signal(s) Y(k, n), $V_{ss\text{-}SNR:p}$(k, n) denotes SNR step-size values associated with the pth beam index (e.g., reference beam(s)), and $V_{ss:m\cdot p}$(k, n) denotes step-size values 645 associated with the mth channel index and the pth beam index. While Equation [15.2] specifies a portion of the third adaptation step-size values that correspond to the mth channel index and pth beam index (e.g., $V_{ss:m\cdot p}$(k, n)), this is intended to conceptually illustrate how these values are calculated and the disclosure is not limited thereto. Instead, the step-size values 645 may be generally referred to as $V_{ss}$(k, n), without specifying a particular combination of channel indexes without departing from the disclosure.

In some examples, the sigmoid function can be defined as:

$$\text{sigmoid}(t) = \frac{a}{(1 + \exp(-b * (t - c)))} \quad [16]$$

where a, b, and c represent adjustable parameters. In some examples, the device 110 may set the first adjustable parameter a to a first value (e.g., 1.0), the second adjustable parameter b to a second value (e.g., 15), and the third adjustable parameter c to a third value (e.g., 0.5), although the disclosure is not limited thereto.

FIG. 9 illustrates examples of a sigmoid function and a variable step-size controlled based on a signal quality metric according to embodiments of the present disclosure. As illustrated in FIG. 9, the system 100 may use a sigmoid function 910 to determine the variable step-size value $V_{ss}$. For example, the system 100 may select parameters for A and B in order to tune the variable step-size value $V_{ss}$ relative to the signal-to-noise ratio (SNR). In this example, the system 100 may select parameters for A and B such that a first variable step-size value (e.g., $V_{ss}$=0.5) corresponds to a first SNR value (e.g., SNR=7 dB) and a second variable step-size value (e.g., $V_{ss}$=0) corresponds to SNR values exceeding a second SNR value (e.g., SNR≥15 dB). Additionally or alternatively, the system 100 may freeze adaptation for variable step-size values below the first variable step-size value (e.g., $V_{ss}$<0.5), which is equivalent of freezing adaptation for SNR values exceeding a third SNR value (e.g., SNR≥7 dB).

An example of controlling the variable step-size value $V_{ss}$ based on a signal quality metric is illustrated in FIG. 9 as $V_{ss\text{-}SNR}$ chart 920. As shown in the $V_{ss\text{-}SNR}$ chart 920, the variable step-size value $V_{ss}$ goes to zero when there is an utterance or a wakeword represented in the audio data.

The step-size controller component 640 may send the step-size values $V_{ss}$(k, n) 645 to the transfer function 620 (e.g., first adaptive filter) and the transfer function 620 may use the step-size values $V_{ss}$(k, n) 645 to control how quickly the first adaptive filter updates the plurality of filter coefficient values.

As described above, the step-size controller component 640 may control the step-size value $V_{ss}$(k, n) 645 so that the first adaptive filter adapts slowly when the microphone power level is low and/or near-end signals are present and adapts quickly when the near-end signal is not present. Thus, the first adaptive filter updates the adaptive filter coefficient values (e.g., weights) when the near-end signal is not present, enabling the system 100 to better model the near-end disturbance statistics while the near-end signal is present. In addition to selecting a lower step-size value, the system 100 may also slow a rate at which the adaptive filters update the plurality of filter coefficient values, although the disclosure is not limited thereto.

To stop the adaptive filter from diverging in the presence of a large near-end signal, in some examples the system 100 may constrain the filter update at each iteration:

$$\left\|\hat{W}_p(k, n) - \hat{W}_p(k, n-1)\right\|^2 \leq \delta \quad [17]$$

where $\hat{W}_p$(k, n) denotes the weight vector (e.g., adaptive filter coefficients weight vector) for the pth beam index, kth tone index, and nth frame index, $\hat{W}_p$(k, n−1) denotes the weight vector for a previous frame index (e.g., n−1), and δ denotes a threshold parameter. The system 100 may select a fixed value of the threshold parameter δ for all tone indexes and/or frame indexes, although the disclosure is not limited thereto and in some examples the system 100 may determine the threshold parameter individually for each tone index and/or frame index (e.g., $\delta_{k,n}$) without departing from the disclosure.

Additionally or alternatively, the system 100 may control an adaptation speed of the first adaptive filter by performing error normalization to limit the rate of adaptation. As illustrated in FIG. 6, an error normalization component 650 may receive the error signal E(k, n) 635 and determine a normalized error signal $E_n$(k, n) 655. For example, the error normalization component 650 may determine if the error signal 635 exceeds a first threshold value, which may correspond to a standard deviation of the error signal 635. A standard deviation (e.g., std( )) is a measure of how dispersed the data is in relation to the mean. For example, a low standard deviation indicates that data is clustered around the mean, whereas a high standard deviation indicates that data is more spread out. Thus, if the error signal 635 exceeds the first threshold value, the system 100 may perform error normalization and determine the normalized error signal while limiting the rate of adaptation. An example of performing error normalization is shown below:

$$\text{If } \left(|E(k, n)|^2 > \text{var}(E(k, n))\right) \quad [18]$$

$$E(k, n) = std(E(k, n)) * \frac{E(k, n)}{|E(k, n)|}$$

$$\text{var} = \alpha * |E(k, n)|^2 + (1 - \alpha) * \text{var}$$

where k denotes a tone index (e.g., frequency bin), n denotes a frame index (e.g., group of samples), E(k, n) denotes the error signal 635 for the kth tone index and nth frame index, $|E(k, n)|^2$ denotes a power level associated with the error signal 635, var(E(k, n)) corresponds to a first threshold value and indicates a variance of the error signal 635, std(E(k, n)) indicates a standard deviation of the error signal 635 (e.g., std=$\sqrt{\text{var}}$), |E(k, n)| represents an absolute value of the error signal 635, and α is a smoothing parameter (e.g., forgetting factor) corresponding to an amount of smoothing. While Equation [18] illustrate a specific example of the first threshold value (e.g., var(E(k, n))), the disclosure is not limited thereto and the first threshold value may vary without departing from the disclosure. Thus, if the error signal 635 exceeds a threshold value (e.g., variance of the error signal 635), the system 100 may perform error normalization and determine the normalized error signal 655 while limiting the rate of adaptation.

As illustrated in FIG. 6, the error normalization component 650 may output the normalized error signal $E_n(k, n)$ 655 to a filter coefficient update component 660, which may also receive the step-size values $V_{ss}(k, n)$ 645 from the step-size controller component 640. Using the step-size values $V_{ss}(k, n)$ 645 and the normalized error signal $E_n(k, n)$ 655, the filter coefficient update component 660 may generate updated filter coefficients $W_p(k, n)$ 665 associated with the first adaptive filter (e.g., transfer function 620). For example, using the step-size parameter $V_{ss}$ and/or the normalized error signal, the system 100 may perform a coefficient update 840 to determine adaptive filter coefficient values for the first adaptive filter, as shown below:

$$W(k, n+1) = W(k, n) + \mu\frac{V_{ss}(k, n)E(k, n)X*(k, n)}{\alpha\|X(k, n)\|^2 + \delta} \quad [19]$$

where p denotes a beam index associated with the reference beam(s) X(k, n) 615, k denotes a tone index (e.g., frequency bin), n denotes a frame index (e.g., group of samples), W(k, n+1) denotes a first adaptive filter coefficients weight vector for the pth beam index, kth tone index, and (n+1)-th frame index (e.g., updated weight vector $W_p(k, n+1)$), W(k, n) denotes a second adaptive filter coefficients weight vector for the pth beam index, kth tone index, and the nth frame index (e.g., previous weight vector $W_p(k, n)$), $V_{ss}(k, n)$ denotes adaptation step-size values for the kth tone index and nth frame index (e.g., one or more vectors of adaptation step-size values), μ is a first tunable design parameter that represents a fixed value between zero and one (e.g., $0 \leq \mu \leq 1$), E(k, n) denotes the error signal 635 for the kth tone index and nth frame index, $X^+(k, n)$ denotes a conjugate of the reference beam(s) X(k, n) 615 for the kth tone index and nth frame index, a is a second tunable design parameter that corresponds to a scaling factor, ||X(k, n)|| denotes a vector norm (e.g., vector length, such as a Euclidian norm) associated with the reference beam(s) X(k, n) 615, and δ is a nominal value to avoid dividing by zero (e.g., regularization parameter).

In some examples, the system 100 may use a leaky update algorithm to add a forgetting factor on the filter coefficient values. For example, the system 100 may include a forgetting factor to enable the first adaptive filter to forget the weights during periods of low speech power (e.g., near-end speech is not present). Thus, the system 100 may perform leaky updates on the filter coefficient weights to reduce a magnitude of the weights and therefore reduce bias towards the speech. In some examples, the forgetting factor may be set to a first value (e.g., γ=0.987), although the disclosure is not limited thereto. An example of performing leaky updates is shown below:

$$W(k, n) = W(k, n-1) * \gamma \quad [20]$$

where γ is a forgetting factor corresponding to an amount of decay (e.g., γ=0.987 corresponds to a decay in 60 frames).

In some examples, the system 100 may use the normalized error signal 655 when adapting the first adaptive filter and determining updated filter coefficient values. For example, while Equation [19] illustrates that the system 100 may determine a first adaptive filter coefficients weight vector using the error signal E(k, n) 635, the disclosure is not limited thereto and the system 100 may determine the first adaptive filter coefficients weight vector using the normalized error signal $E_n(k, n)$ 655 without departing from the disclosure. Thus, the system 100 may substitute the normalized error signal $E_n(k, n)$ 655 in order to control a rate at which the adaptive filter coefficients update when the error exceeds the threshold value.

While some of the signals and/or parameters illustrated in Equation [19] are not illustrated as being specific to a beam index p, this is intended for ease of illustration and the disclosure is not limited thereto. For example, X(k, n) may refer broadly to the reference beam(s) and may encompass one or more channels (e.g., $X_1(k, n)$, $X_2(k, n)$, etc.), while $X_p(k, n)$ may refer to an individual channel of the reference beam(s) (e.g., pth beam index) without departing from the disclosure. Similarly, $V_{ss}(k, n)$ may refer broadly to the adaptation step-size values associated with one or more channels of the reference beam(s), while $V_{ss\text{-}p}(k, n)$ may refer to a single vector of adaptation step-size values associated with an individual channel of the reference beam(s) (e.g., pth beam index), although the disclosure is not limited thereto.

In some examples, the first tunable parameter u and/or the second tunable parameter a may correspond to values between zero and one (e.g., $0 \leq \mu \leq 1$ and/or $0 \leq \alpha \leq 1$) that may be selected by the system 100 to improve a performance of the AEC component 104. To illustrate an example, the system 100 may select the first tunable parameter μ and/or the second tunable parameter α based on parameters associated with the device 110 and/or a type of device (e.g., device model), such that the first tunable parameter μ and/or the second tunable parameter a are fixed values that remain static over time. For example, the first tunable parameter μ and/or the second tunable parameter α may be optimal values determined based on device testing, simulations, and/or the like. However, the disclosure is not limited thereto, and in other examples the device 110 may collect data and iteratively change the first tunable parameter μ and/or the second tunable parameter α depending on an amount of echo leakage (e.g., echo signal represented in the error signal 635) and/or a type of echo leakage.

To illustrate an example, the device 110 may select a relatively higher value for the first tunable parameter (e.g., μ=0.9) in order to adapt more quickly (e.g., perform more aggressive adaptation) or may select a relatively lower value for the first tunable parameter (e.g., μ=0.3) in order to adapt more slowly (e.g., perform less aggressive adaptation). While Equation [19] illustrates an example that includes both the first tunable parameter μ and the second tunable parameter α, the disclosure is not limited thereto and Equation may only include the first tunable parameter μ and/or the second tunable parameter α without departing from the disclosure.

Using the adaptive filter coefficient values W(k, n) and the reference beam(s) X(k, n) 615, the system 100 may determine the reference noise signal Y(k, n) 625, as shown below:

$$Y(k,n)=X(k,n)W(k,n)^T \quad [21]$$

After determining the reference noise signal Y(k, n) 625, the system 100 may perform beam cancellation by subtracting the reference noise signal Y(k, n) 625 from the target beam(s) Z(k, n) 610 to generate the error signal E(k, n) 635.

$$E(k,n)=Z(k,n)-Y(k,n) \quad [22]$$

In addition to improving beam cancellation by dynamically determining the variable step-size values, the device 110 may also improve reference beam selection. For example, the device 110 may dynamically select reference beams for each target beam based on a combination of geometry and/or reference power levels. In some examples, the device 110 may select a first portion of the reference beams based on a known configuration and a location of the target beam. For example, the device 110 may select one or more reference beams that are opposite the target beam, such that the selected reference beams are unique for each individual target beam. Examples include the single fixed noise reference configuration 410, the double fixed noise reference configuration 420, and/or the like, which were described in greater detail above with regard to FIG. 4A. Additionally or alternatively, the device 110 may dynamically select a second portion of the reference beams to include noise sources associated with high noise levels. For example, the device 110 may identify one or more directions associated with high noise levels and may use these as reference beams for multiple target beams. In some examples, the device 110 may exclude one or more directions associated with high noise levels as reference beams to create spatial separation between the desired speech and the reference beams.

Figure 10:
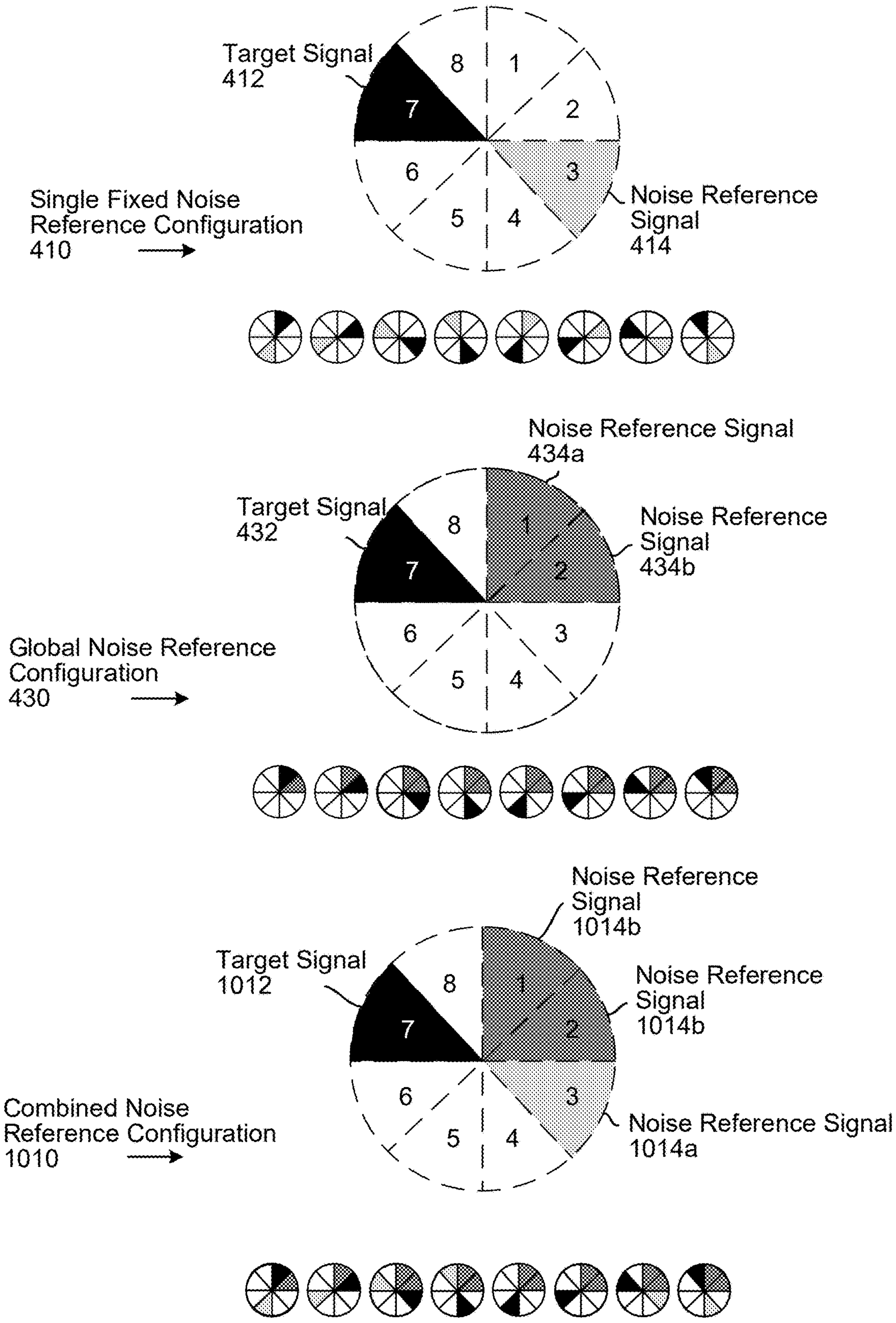
FIG. 10 illustrates an example of a hybrid noise reference configuration according to embodiments of the present disclosure.

FIG. 10 illustrates an example of a hybrid noise reference configuration according to embodiments of the present disclosure. As described above, in some examples the device 110 may dynamically select reference beams for each target beam based on a combination of geometry and/or reference power levels. For example, the device 110 may select a first portion of the reference beams based on a known beam configuration and may dynamically select a second portion of the reference beams to include noise sources associated with high noise levels. As illustrated in FIG. 10, the device 110 may combine the single fixed noise reference configuration 410 and the global noise reference configuration 430, described above with regard to FIGS. 4A-4B.

As described in greater detail above with regard to FIG. 4A, in the single fixed noise reference configuration 410 the device 110 may associate each target beam with an individual reference beam that is opposite the target beam. For example, if the target signal 412 corresponds to the seventh directional output (e.g., Direction 7), the device 110 may select the third directional output (e.g., Direction 3) as the noise reference signal 414. The device 110 may continue this pattern for each of the directional outputs, using Direction 1 as a target signal and Direction 5 as a noise reference signal, Direction 2 as a target signal and Direction 6 as a noise reference signal, Direction 3 as a target signal and Direction 7 as a noise reference signal, Direction 4 as a target signal and Direction 8 as a noise reference signal, Direction 5 as a target signal and Direction 1 as a noise reference signal, Direction 6 as a target signal and Direction 2 as a noise reference signal, Direction 7 as a target signal and Direction 3 as a noise reference signal, and Direction 8 as a target signal and Direction 4 as a noise reference signal.

As described in greater detail above with regard to FIG. 4B, in the global noise reference configuration 430 the device 110 may identify global reference beams that apply to each of the target beams. For example, if the device 110 associates one or more directional outputs with high noise levels and/or a noise source (e.g., external loudspeaker), the device 110 may use these directional outputs as reference beams for each of the individual target beams. In the example illustrated in FIG. 10, the device 110 may associate the first directional output (e.g., Direction 1) and the second directional output (e.g., Direction 2) with high noise levels and/or a noise source and may select these directional outputs as the reference beams for every target beam. Thus, the device 110 may select the first directional output (e.g., Direction 1) as a first noise reference signal 434*a* and the second directional output (e.g., Direction 2) as a second noise reference signal 434*b* for each of the target signals 432 (e.g., Directions 1-8). As illustrated in FIG. 10, however, the first directional output (e.g., Direction 1) is not used as the first noise reference signal 434*a* when the first directional output is selected as the target signal 432, and the second directional output (e.g., Direction 2) is not selected as the second noise reference signal 434*b* when the second directional output is selected as the target signal 432.

FIG. 10 illustrates an example of combining the single fixed noise reference configuration 410 and the global noise reference configuration 430 to generate a combined noise reference configuration 1010 (e.g., hybrid noise reference configuration). For example, the device 110 may use a known beam configuration to select one or more first reference signals for an individual target signal. In the example illustrated in FIG. 10, the device 110 may select the third directional output (e.g., Direction 3) as a first noise reference signal 1014*a* when the seventh directional output (e.g., Direction 7) is selected as a target signal 1012. In addition, the device 110 may dynamically select one or more second reference signals for all of the target signals. For example, the device 110 may select the first directional output (e.g., Direction 1) and the second directional output (e.g., Direction 2) as second noise reference signals 1014*b* for each of the target signals 1012 (e.g., Directions 1-8).

In some examples, the device 110 may exclude one or more directions associated with high noise levels as reference beams to create spatial separation between a target beam and corresponding reference beams. For example, the device 110 may perform neighbor exclusion to ensure that a target beam is not associated with a reference beam that is adjacent to the target beam. This ensures that there is no overlap between the target beam and the reference beam, which would degrade performance of the beam cancellation and/or an audio quality of the output audio.

Figure 11:
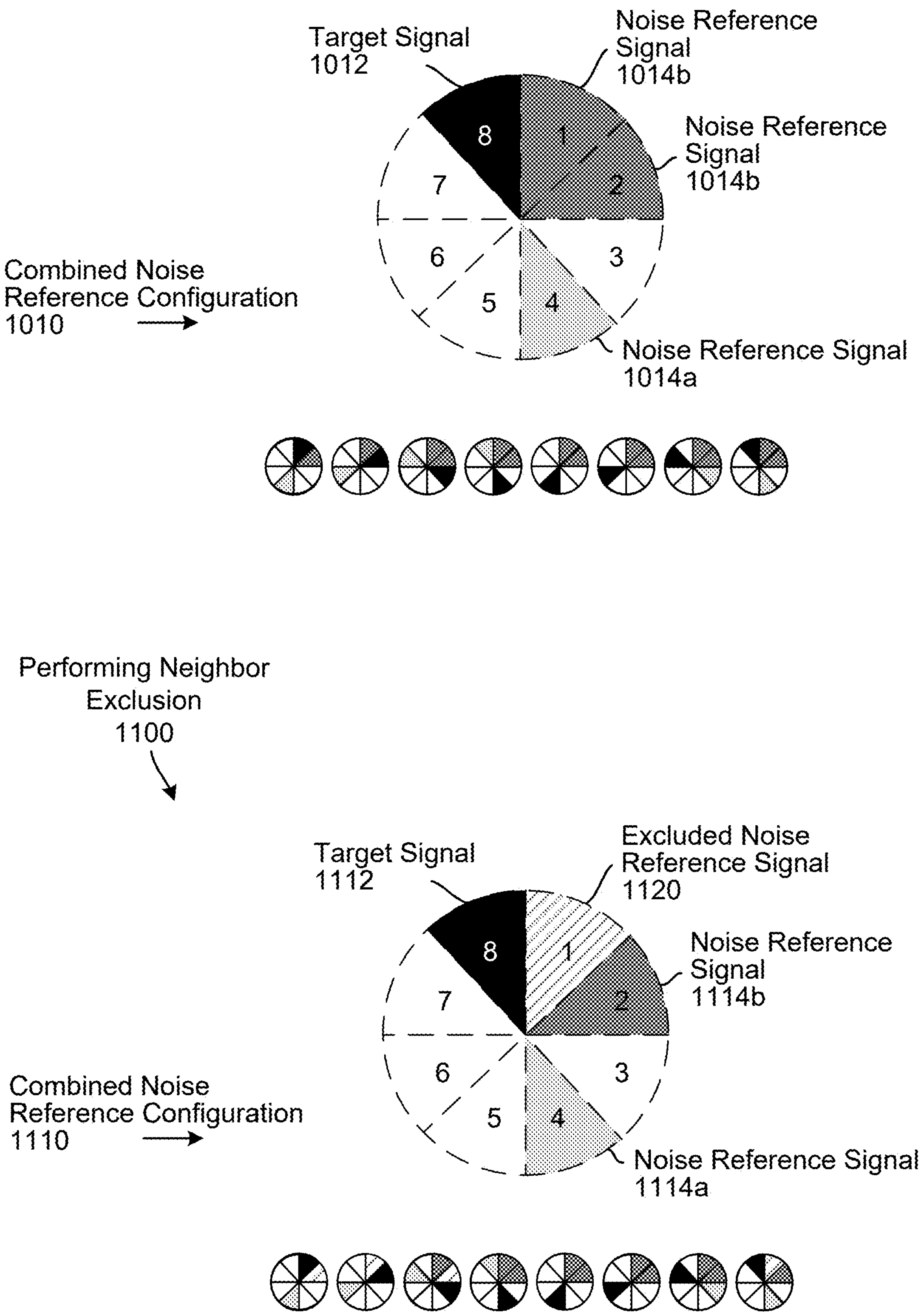
FIG. 11 illustrates an example of performing neighbor exclusion according to embodiments of the present disclosure.

FIG. 11 illustrates an example of performing neighbor exclusion according to embodiments of the present disclosure. As illustrated in FIG. 11, the combined noise reference configuration 1010 includes examples in which a target signal is adjacent to one of the second noise reference signals 1014*b*. For example, the first directional output (e.g., Direction 1), the second directional output (e.g., Direction 2), the third directional output (e.g., Direction 3), and the eighth directional output (e.g., Direction 8) are all adjacent to one of the second noise reference signals 1014*b*, which correspond to the first directional output (e.g., Direction 1) and the second directional output (e.g., Direction 2). To avoid overlap between the target signal 1012 and the noise reference signals 1014, which may occur when the desired speech is represented in the target signal 1012 and the noise reference signals 1014, the device 110 may perform neighbor exclusion to increase spatial separation.

In some examples, the device 110 may determine that a directional output is adjacent to the target signal by calculating an angular value indicating a separation between the second noise reference signals 1014*b* and the target signal, although the disclosure is not limited thereto. For example, the device 110 may determine an angular value between the eighth directional output (e.g., Direction 8) and the first directional output (e.g., Direction 1) and determine that the angular value does not satisfy a condition (e.g., angular value is below a threshold value).

FIG. 11 illustrates an example of performing neighbor exclusion 1100 by removing or excluding noise reference signals 1014 that are adjacent to the target signal 1012. In the combined noise reference configuration 1010 described above, the second noise reference signals 1014 correspond to the first directional output (e.g., Direction 1) and the second directional output (e.g., Direction 2). In the example illustrated in FIG. 11, a target signal 1112 corresponds to the eighth directional output (e.g., Direction 8). As the first directional output (e.g., Direction 1) is adjacent to the target signal 1112, the first directional output is excluded from second noise reference signals 1114*b*. For example, the fourth directional output (e.g., Direction 4) is illustrated as a first noise reference signal 1114*a*, the second directional output (e.g., Direction 2) is illustrated as a second noise reference signal 1114*b*, and the first directional output (e.g., Direction 1) is illustrated as an excluded noise reference signal 1120.

Similarly, if the target signal 1112 corresponds to the third directional output (e.g., Direction 3), the combined noise reference configuration 1110 illustrates the seventh directional output (e.g., Direction 7) as the first noise reference signal 1114*a*, as it is opposite the third directional output, the first directional output (e.g., Direction 1) is illustrated as the second noise reference signal 1114*b*, and the second directional output (e.g., Direction 2) is illustrated as the excluded noise reference signal 1120.

Further, if the target signal 1112 corresponds to the first directional output (e.g., Direction 1), the combined noise reference configuration 1110 illustrates the fifth directional output (e.g., Direction 5) as the first noise reference signal 1114*a* and the second directional output (e.g., Direction 2) as the excluded noise reference signal 1120, such that there isn't a second noise reference signal 1114*b*. Likewise, if the target signal 1112 corresponds to the second directional output (e.g., Direction 2), the combined noise reference configuration 1110 illustrates the sixth directional output (e.g., Direction 6) as the first noise reference signal 1114*a* and the first directional output (e.g., Direction 1) as the excluded noise reference signal 1120, such that there isn't a second noise reference signal 1114*b*.

While FIG. 11 illustrates an example of excluding a noise reference signal that is adjacent to the target signal, the disclosure is not limited thereto. In some examples, in addition to excluding the adjacent noise reference signal, the device 110 may determine an alternate noise reference signal. For example, if the excluded noise reference signal 1120 corresponds to a highest noise power (e.g., first noise source), the device 110 may select a second highest noise power (e.g., second noise source) as a noise reference signal.

Figure 12:
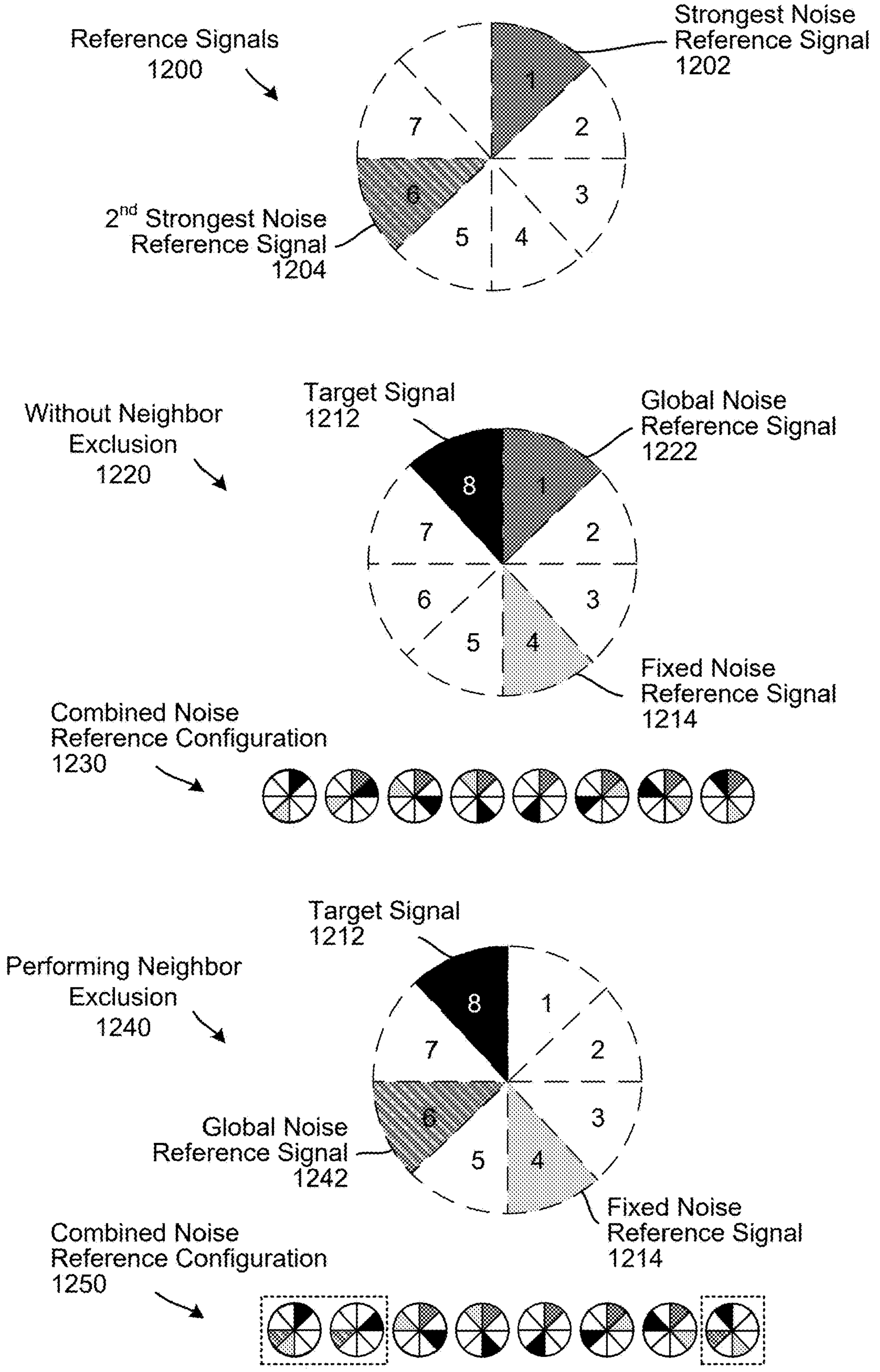
FIG. 12 illustrates an example of performing neighbor exclusion using secondary reference signals according to embodiments of the present disclosure.

FIG. 12 illustrates an example of performing neighbor exclusion using secondary reference signals according to embodiments of the present disclosure. As illustrated in FIG. 12, in some examples the device 110 may detect noise sources in proximity to the device 110 and may determine reference signals 1200 corresponding to the detected noise sources. For example, the device 110 may determine a strongest noise reference signal 1202 associated with the first noise source and a $2^{nd}$ strongest noise reference signal 1204 associated with the second noise source.

To illustrate the improvement, FIG. 12 first illustrates an example of a combination noise reference configuration 1230 generated without neighbor exclusion 1220. For example, if the device 110 selects the eighth directional output (e.g., Direction 8) as a target signal 1212, the device 110 may select the fourth directional output (e.g., Direction 4) as a fixed noise reference signal 1214 and the first directional output (e.g., Direction 1) corresponding to the strongest noise reference signal 1202 as a global noise reference signal 1222. Examples of the combination noise reference configuration 1230 are illustrated for each of the target signals.

In contrast, when performing neighbor exclusion 1240 the device 110 may exclude the strongest noise reference signal 1202 and replace it with the $2^{nd}$ strongest noise reference signal 1204 instead. For example, if the device 110 selects the eighth directional output (e.g., Direction 8) as the target signal 1212, the device 110 may determine that the strongest noise reference signal 1202 is adjacent and may select the sixth directional output (e.g., Direction 6) corresponding to the $2^{nd}$ strongest noise reference signal 1204 as a global noise reference signal 1242 instead. Examples of performing neighbor exclusion 1240 for each of the target signals is illustrated in FIG. 12 as a combined noise reference configuration 1250. For example, the device 110 may select the global noise reference signal 1242 corresponding to the $2^{nd}$ strongest noise reference signal 1204 when the target signal 1212 corresponds to the first directional output (e.g., Direction 1), the second directional output (e.g., Direction 2), and the eight directional output (e.g., Direction 8).

Figure 13:
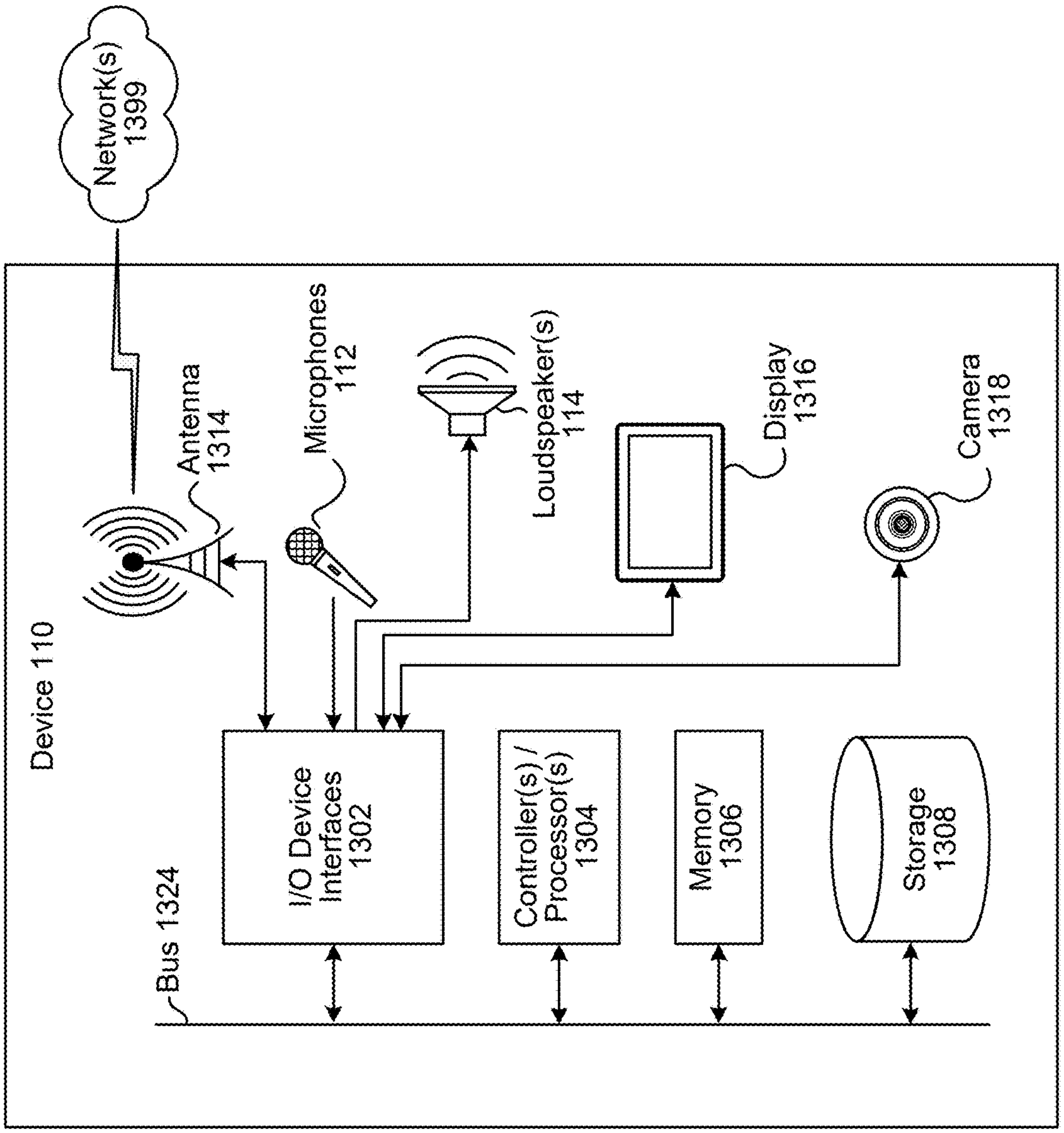
FIG. 13 is a block diagram conceptually illustrating example components of a system for performing beam cancellation according to embodiments of the present disclosure.

FIG. 13 is a block diagram conceptually illustrating a device 110 that may be used with the system. In operation, the system 100 may include computer-readable and computer-executable instructions that reside on the device 110, as will be discussed further below.

The device 110 may include one or more audio capture device(s), such as microphones 112 or an array of microphones. The audio capture device(s) may be integrated into the device 110 or may be separate. The device 110 may also include an audio output device for producing sound, such as loudspeaker(s) 114. The audio output device may be integrated into the device 110 or may be separate. In some examples the device 110 may include a display 1316, but the disclosure is not limited thereto and the device 110 may not include a display or may be connected to an external device/display without departing from the disclosure.

The device 110 may include one or more controllers/processors (1304), which may each include a central processing unit (CPU) for processing data and computer-readable instructions, and a memory (1306) for storing data and instructions of the respective device. The memory (1306) may individually include volatile random access memory (RAM), non-volatile read only memory (ROM), non-volatile magnetoresistive memory (MRAM), and/or other types of memory. The device 110 may also include a data storage component (1308) for storing data and controller/processor-executable instructions. Each data storage component (1308) may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces (1302).

Computer instructions for operating the device 110 and its various components may be executed by the respective device's controller(s)/processor(s) (1304), using the memory (1306) as temporary "working" storage at runtime. A device's computer instructions may be stored in a non-transitory manner in non-volatile memory (1306), data storage component (1308), or an external device(s). Alternatively, some or all of the executable instructions may be embedded in hardware or firmware on the respective device in addition to or instead of software.

The device 110 includes input/output device interfaces (1302). A variety of components may be connected through the input/output device interfaces (1302), such as the microphones 112, the loudspeaker(s) 114, and/or the display 1316. The input/output interfaces (1302) may include A/D converters for converting the output of the microphones 112 into microphone audio data, if the microphones 112 are integrated with or hardwired directly to the device 110. If the microphones 112 are independent, the A/D converters will be included with the microphones 112, and may be clocked independent of the clocking of the device 110. Likewise, the input/output interfaces 1302 may include D/A converters for converting output audio data into an analog current to drive the loudspeaker(s) 114, if the loudspeaker(s) 114 are integrated with or hardwired to the device 110. However, if the loudspeaker(s) 114 are independent, the D/A converters will be included with the loudspeaker(s) 114 and may be clocked independent of the clocking of the device 110 (e.g., conventional Bluetooth loudspeakers).

Additionally, the device 110 may include an address/data bus (1324) for conveying data among components of the respective device. Each component within a device 110 may also be directly connected to other components in addition to (or instead of) being connected to other components across the bus (1324).

Referring to FIG. 13, the device 110 may include input/output device interfaces 1302 that connect to a variety of components such as an audio output component such as loudspeaker(s) 1312, a wired headset or a wireless headset (not illustrated), or other component capable of outputting audio. The device 110 may also include an audio capture component. The audio capture component may be, for example, microphones 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content and/or a camera 1318 to capture image data, although the disclosure is not limited thereto. The input/output device interfaces (1302) may also include an interface for an external peripheral device connection such as universal serial bus (USB), FireWire, Thunderbolt or other connection protocol.

The device 110 may connect to one or more network(s) 1399 through either wired and/or wireless connections. For example, the device 110 may connect to the network(s) 1399 via an Ethernet port, through a wireless service provider (e.g., using a WiFi or cellular network connection), over a wireless local area network (WLAN) (e.g., using WiFi or the like), over a wired connection such as a local area network (LAN), and/or the like. The network(s) 1399 may include a local or private network or may include a wide network such as the Internet.

As illustrated in FIG. 13, the input/output device interfaces 1302 may connect to the network(s) 1399 via antenna(s) 1314. For example, the device 110 may connect to the network(s) 1399 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 1399, the system may be distributed across a networked environment. The I/O device interface (1302) may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces (1302), processor(s) (1304), memory (1306), and/or data storage component (1308) of the device 110, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving microphone audio data associated with a microphone array of a device;

generating directional audio data using the microphone audio data, the directional audio data comprising:

first audio data corresponding to a first direction relative to the device, and second audio data corresponding to a second direction relative to the device, the second direction different from the first direction;

determining, using the second audio data and a first plurality of filter coefficient values associated with a first adaptive filter, first reference data;

determining first error data using the first reference data and the first audio data;

determining a first range of values associated with the microphone audio data and a first time window;

determining, using the first range of values and the microphone audio data, a first step-size value of the first adaptive filter, wherein the first step-size value represents a rate at which the first adaptive filter updates filter coefficients over time; and determining, using the first error data, the first step-size value, the second audio data, and the first plurality of filter coefficient values, a second plurality of filter coefficient values associated with the first adaptive filter.

2. The computer-implemented method of claim 1, wherein determining the first step-size value further comprises:

determining, using the first range of values and a first value of the microphone audio data, a second step-size value;

determining a signal quality metric value associated with the first audio data;

determining, using the signal quality metric value, a third step-size value; and determining the first step-size value using the second step-size value and the third step-size value.

3. The computer-implemented method of claim 1, wherein determining the first step-size value further comprises:

determining, using the first range of values and a first value of the microphone audio data, a second step-size value;

determining, using the second step-size value, a second value; and determining the first step-size value using the second value and a sigmoid function.

4. The computer-implemented method of claim 1, wherein determining the first step-size value further comprises:

determining a first value representing a lowest value of the first range of values;

determining a second value representing a highest value of the first range of values;

determining a third value representing an energy level of the microphone audio data;

determining a first difference value by subtracting the first value from the third value;

determining a second difference value by subtracting the first value from the second value; and determining the first step-size value by dividing the first difference value by the second difference value.

5. The computer-implemented method of claim 1, further comprising:

determining, using a portion of the first audio data, first power values;

determining, using the first power values, first noise floor data;

determining a lowest value represented in the first noise floor data; and determining, using the lowest value, a second step-size value, wherein the first step-size value is determined using the second step-size value.

6. The computer-implemented method of claim 1, wherein determining the first reference data further comprises:

determining an association between the first direction and the second direction;

determining that a noise source is associated with third audio data corresponding to a third direction relative to the device, the third direction different from the second direction; and determining, using the second audio data, the third audio data, and the first plurality of filter coefficient values, the first reference data.

7. The computer-implemented method of claim 1, wherein determining the first reference data further comprises:

determining that a first noise level associated with the second audio data satisfies a condition;

determining that a second noise level associated with third audio data satisfies the condition, the third audio data corresponding to a third direction relative to the device, the third direction different from the second direction;

determining an angular value indicating a separation between the first direction and the third direction;

determining that the angular value is below a threshold value; and determining, using the second audio data and the first plurality of filter coefficient values, the first reference data.

8. The computer-implemented method of claim 1, wherein determining the first reference data further comprises:

determining that third audio data is associated with a highest noise level represented in the directional audio data, the third audio data corresponding to a third direction relative to the device, the third direction different from the second direction;

determining that a first angular value does not satisfy a condition, the first angular value representing a separation between the first direction and the third direction;

determining that the second audio data is associated with a second highest noise level represented in the directional audio data;

determining that a second angular value satisfies the condition, the second angular value representing a separation between the first direction and the second direction; and determining, using the second audio data and the first plurality of filter coefficient values, the first reference data.

9. The computer-implemented method of claim 1, further comprising:

determining that third audio data is associated with a highest noise level represented in the directional audio data, the third audio data corresponding to a third direction relative to the device, the third direction different from the second direction;

determining that a first angular value satisfies a condition, the first angular value representing a separation between the second direction and the third direction;

determining second reference data using the third audio data and a third plurality of filter coefficient values associated with a second adaptive filter;

determining second error data using the second reference data and the second audio data; and determining, using the second error data, the first step-size value, the third audio data, and the third plurality of filter coefficient values, a fourth plurality of filter coefficient values associated with the second adaptive filter.

10. The computer-implemented method of claim 1, further comprising:

determining, using a portion of the second audio data and the second plurality of filter coefficient values, second reference data;

determining second error data using the second reference data and a portion of the first audio data; and determining, using the second error data, the first step-size value, the second audio data, and the second plurality of filter coefficient values, a third plurality of filter coefficient values associated with the first adaptive filter.

11. The computer-implemented method of claim 1, further comprising:

determining a second range of values associated with the microphone audio data and a second time window;

determining, using the second range of values and the microphone audio data, a second step-size value associated with the first adaptive filter; and determining, using second error data, the second step-size value, the second audio data, and the second plurality of filter coefficient values, a third plurality of filter coefficient values associated with the first adaptive filter.

12. The computer-implemented method of claim 1, wherein the directional audio data is generated using a beamformer component of the device, the first reference data includes a representation of an audible sound associated with the second direction, and the first error data is determined by subtracting the first reference data from the first audio data.

13. A system comprising:

at least one processor; and memory including instructions operable to be executed by the at least one processor to cause the system to:

receive microphone audio data associated with a microphone array of a device;

generate directional audio data using the microphone audio data, the directional audio data comprising:

first audio data corresponding to a first direction relative to the device, and second audio data corresponding to a second direction relative to the device, the second direction different from the first direction;

determine, using the second audio data and a first plurality of filter coefficient values associated with a first adaptive filter, first reference data;

determine first error data using the first reference data and the first audio data;

determine a first range of values associated with the microphone audio data and a first time window;

determine, using the first range of values and the microphone audio data, a first step-size value of the first adaptive filter, wherein the first step-size value represents a rate at which the first adaptive filter updates filter coefficients over time; and determine, using the first error data, the first step-size value, the second audio data, and the first plurality of filter coefficient values, a second plurality of filter coefficient values associated with the first adaptive filter.

14. The system of claim 13, wherein the memory further comprises instructions that, when executed by the at least one processor, further cause the system to:

determine, using the first range of values and a first value of the microphone audio data, a second step-size value;

determine a signal quality metric value associated with the first audio data;

determine, using the signal quality metric value, a third step-size value; and determine the first step-size value using the second step-size value and the third step-size value.

15. The system of claim 13, wherein the memory further comprises instructions that, when executed by the at least one processor, further cause the system to:

determine, using the first range of values and a first value of the microphone audio data, a second step-size value;

determine, using the second step-size value, a second value; and determine the first step-size value using the second value and a sigmoid function.

16. The system of claim 13, wherein the memory further comprises instructions that, when executed by the at least one processor, further cause the system to:

determine a first value representing a lowest value of the first range of values;

determine a second value representing a highest value of the first range of values;

determine a third value representing an energy level of the microphone audio data;

determine a first difference value by subtracting the first value from the third value;

determine a second difference value by subtracting the first value from the second value; and determine the first step-size value by dividing the first difference value by the second difference value.

17. The system of claim 13, wherein the memory further comprises instructions that, when executed by the at least one processor, further cause the system to:

determine, using a portion of the first audio data, first power values;

determine, using the first power values, first noise floor data;

determine a lowest value represented in the first noise floor data; and determine, using the lowest value, a second step-size value, wherein the first step-size value is determined using the second step-size value.

18. The system of claim 13, wherein the memory further comprises instructions that, when executed by the at least one processor, further cause the system to:

determine an association between the first direction and the second direction;

determine that a noise source is associated with third audio data corresponding to a third direction relative to the device, the third direction different from the second direction; and determine, using the second audio data, the third audio data, and the first plurality of filter coefficient values, the first reference data.

19. The system of claim 13, wherein the memory further comprises instructions that, when executed by the at least one processor, further cause the system to:

determine that a first noise level associated with the second audio data satisfies a condition;

determine that a second noise level associated with third audio data satisfies the condition, the third audio data corresponding to a third direction relative to the device, the third direction different from the second direction;

determine an angular value indicating a separation between the first direction and the third direction;

determine that the angular value is below a threshold value; and determine, using the second audio data and the first plurality of filter coefficient values, the first reference data.

20. The system of claim 13, wherein the memory further comprises instructions that, when executed by the at least one processor, further cause the system to:

determine, using a portion of the second audio data and the second plurality of filter coefficient values, second reference data;

determine second error data using the second reference data and a portion of the first audio data; and determine, using the second error data, the first step-size value, the second audio data, and the second plurality of filter coefficient values, a third plurality of filter coefficient values associated with the first adaptive filter.

* * * * *